(12) United States Patent
Ando et al.

(10) Patent No.: US 11,459,007 B2
(45) Date of Patent: Oct. 4, 2022

(54) DRAWING COMPONENT GENERATION DEVICE, DISPLAY SYSTEM, AND DRAWING COMPONENT GENERATION METHOD

(71) Applicant: Mitsubishi Electric Corporation, Tokyo (JP)

(72) Inventors: Eisho Ando, Tokyo (JP); Ryosuke Goto, Tokyo (JP); Masayo Nakagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/276,313

(22) PCT Filed: Sep. 21, 2018

(86) PCT No.: PCT/JP2018/035178
§ 371 (c)(1),
(2) Date: Mar. 15, 2021

(87) PCT Pub. No.: WO2020/059141
PCT Pub. Date: Mar. 26, 2020

(65) Prior Publication Data
US 2022/0032976 A1 Feb. 3, 2022

(51) Int. Cl.
*B61L 15/00* (2006.01)
*G06T 11/00* (2006.01)
(Continued)

(52) U.S. Cl.
CPC .......... *B61L 15/009* (2013.01); *G06T 11/001* (2013.01); *G06T 11/203* (2013.01); *G06T 11/60* (2013.01); *G06T 2200/24* (2013.01)

(58) Field of Classification Search
CPC ...... B61L 15/009; B61L 25/04; G06T 11/001; G06T 11/203; G06T 11/60; G06T 2200/24; B60L 3/00
See application file for complete search history.

(56) References Cited

U.S. PATENT DOCUMENTS

2017/0106883 A1* 4/2017 Shubs, Jr. ............. B61L 15/009
2017/0369084 A1 12/2017 Goda et al.

FOREIGN PATENT DOCUMENTS

| JP | 2009101964 A | 5/2009 |
|---|---|---|
| WO | 2016117025 A1 | 7/2016 |
| WO | 2018138923 A1 | 8/2018 |

OTHER PUBLICATIONS

International Search Report (PCT/ISA/210) and Written Opinion (PCT/ISA/237) dated Nov. 20, 2018, by the Japan Patent Office as the International Searching Authority for International Application No. PCT/JP2018/035178.

(Continued)

*Primary Examiner* — Jennifer Mehmood
*Assistant Examiner* — Andrew Shin
(74) *Attorney, Agent, or Firm* — Buchanan Ingersoll & Rooney PC

(57) ABSTRACT

A drawing component generation device generating a drawing component when a train cab display device installed in a train is to display status of a device installed in a car of a train on a display screen using the drawing component, which is a modularized part of display content to be displayed on the display screen, includes a reception unit providing an input screen displaying entries for information used for generating the drawing component based on a train display definition defining a train formation pattern, and a device layout definition defining a layout pattern, and receiving input of information for the entries from a user; and a generation unit generating the drawing component based on the train display definition, the device layout definition, input information being information input from the user on the reception unit, and a display pattern definition defining display content relating to the status of the device.

18 Claims, 30 Drawing Sheets

(51) Int. Cl.
*G06T 11/20* (2006.01)
*G06T 11/60* (2006.01)

(56) References Cited

OTHER PUBLICATIONS

Office Action dated Feb. 2, 2022, issued in corresponding Indian Patent Application No. 202127010911, 5 pages.

\* cited by examiner

FIG.3
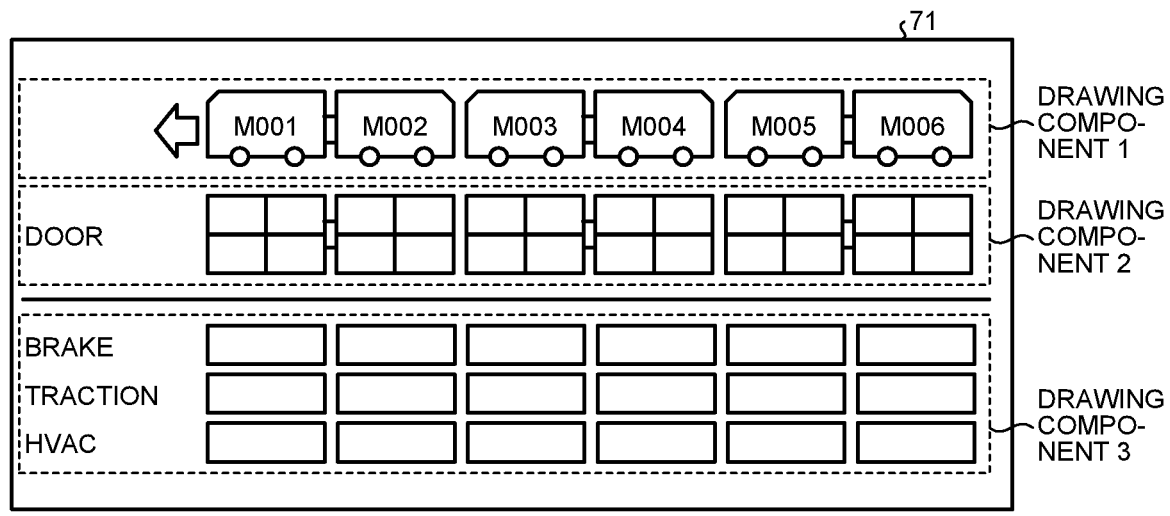
FIG.4
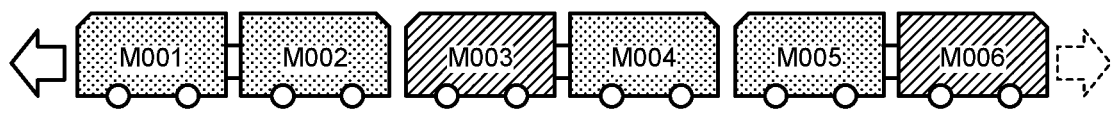
FIG.5
| | | \multicolumn{6}{c}{DISPLAYED CAR NUMBER} | | | | | |
|---|---|---|---|---|---|---|---|
| | | 1 | 2 | 3 | 4 | 5 | 6 |
| 0 | PRESENCE OR ABSENCE OF FAULT | 1 | 1 | 2 | 1 | 1 | 2 |
| 1 | TRAVEL DIRECTION | 1 | 0 | 0 | 0 | 0 | 0 |

|   |         | DISPLAYED CAR NUMBER ||||||
|---|---------|---|---|---|---|---|---|
|   |         | 1 | 2 | 3 | 4 | 5 | 6 |
| 1 | DOOR R1 | 1 | 3 | 1 | 2 | 1 | 1 |
| 2 | DOOR R2 | 1 | 1 | 1 | 1 | 1 | 1 |
| 3 | DOOR L1 | 1 | 1 | 1 | 1 | 1 | 1 |
| 4 | DOOR L2 | 3 | 1 | 1 | 1 | 1 | 1 |

22b

| | | DISPLAYED CAR NUMBER | | | | | |
|---|---|---|---|---|---|---|---|
| | | 1 | 2 | 3 | 4 | 5 | 6 |
| 0 | BRAKE | 2 | 0 | 1 | 0 | 1 | 0 |
| 1 | TRACTION | 1 | 2 | 1 | 1 | 1 | 1 |
| 2 | HVAC | 2 | 1 | 3 | 1 | 2 | 1 |

| CAR | 1 | 2 | 3 | 4 | 5 | 6 | 7 | 8 |
|---|---|---|---|---|---|---|---|---|
| CAR ORIENTATION | RE-VERSE | FOR-WARD | RE-VERSE | FOR-WARD | RE-VERSE | FOR-WARD | RE-VERSE | FOR-WARD |
| TRAIN-UNIT | 1 | 1 | 1 | 1 | 1 | 1 | 1 | 1 |
| TRAIN-UNIT ORIENTATION | FOR-WARD | FOR-WARD | FOR-WARD | FOR-WARD | FOR-WARD | FOR-WARD | FOR-WARD | FOR-WARD |

FIG.14

| CAR | 1 | 2 | 3 | 4 | 5 | 6 | 7 | 8 |
|---|---|---|---|---|---|---|---|---|
| CAR ORIENTATION | FOR-WARD | RE-VERSE | RE-VERSE | FOR-WARD | FOR-WARD | RE-VERSE | RE-VERSE | FOR-WARD |
| TRAIN-UNIT | 1 | 1 | 2 | 2 | 3 | 3 | 4 | 4 |
| TRAIN-UNIT ORIENTATION | FOR-WARD | FOR-WARD | RE-VERSE | RE-VERSE | FOR-WARD | FOR-WARD | RE-VERSE | RE-VERSE |

FIG.15

| LAYOUT PATTERN | LAYOUT SCHEME |
|---|---|
| 1 2 1 2 1 2 1 2 | LATERAL, ASCENDING ORDER |
| 2 1 2 1 2 1 2 1 | LATERAL, DESCENDING ORDER |
| 1 2 2 1 1 2 2 1 | LATERAL, ASCENDING ORDER, LINKED WITH CAR ORIENTATION |
| 2 1 1 2 2 1 1 2 | LATERAL, DESCENDING ORDER, LINKED WITH CAR ORIENTATION |

FIG.16

| LAYOUT PATTERN | LAYOUT SCHEME |
|---|---|
| 1 2 3 4 5 6 1 2 3 4 5 6<br>6 5 4 3 2 1 6 5 4 3 2 1 | CLOCKWISE FROM UPPER LEFT, LINKED WITH CAR AND TRAIN-UNIT ORIENTATIONS |
| 1 3 5 6 4 2 1 3 5 6 4 2<br>2 4 6 5 3 1 2 4 6 5 3 1 | DOWNWARD AND LATERAL DIRECTIONS FROM UPPER LEFT, LINKED WITH CAR AND TRAIN-UNIT ORIENTATIONS |

FIG.18

| CAR | ☐☐☐☐☐☐☐ |
| NUMBER OF DEVICES | ☐ |
| LAYOUT SCHEME | ☐ |
| DRAWING COMPONENT NUMBER | ☐ |
| FIRST ITEM NUMBER | ☐ |

FIG.19

| | DRAWING DATA | COLOR |
|---|---|---|
| COLOR PATTERN 1 | 0 | none |
| | 1 | green |
| | 2 | red |
| COLOR PATTERN 2 | 0 | none |
| | 1 | black |
| | 2 | white |
| COLOR PATTERN 3 | 0 | none |
| | 1 | green |
| | 2 | yellow |
| | 3 | red |
| COLOR PATTERN 4 | 0 | none |
| | 1 | white |
| | 2 | yellow |
| COLOR PATTERN 5 | 0 | none |
| | 1 | white |
| | 2 | red |
| COLOR PATTERN 6 | 0 | none |
| | 1 | black |
| | 2 | white |
| | 3 | white |

FIG.20

| | DRAWING DATA | IMAGE |
|---|---|---|
| IMAGE PATTERN 1 | 0 | none |
| | 1 | ⇐ |
| | 2 | ⇒ |

FIG.21

| | DRAWING DATA | TEXT |
|---|---|---|
| TEXT PATTERN 1 | 0 | none |
| | 1 | "OK" |
| | 2 | "ISOLATE" |
| TEXT PATTERN 2 | 0 | none |
| | 1 | "ON" |
| | 2 | "OFFLINE" |
| TEXT PATTERN 3 | 0 | none |
| | 1 | "STOP" |
| | 2 | "HEATING" |
| | 3 | "COOLING" |

|   |   | COLOR PATTERN | TEXT PATTERN | IMAGE PATTERN |
|---|---|---|---|---|
| 0 | PRESENCE OR ABSENCE OF FAULT | COLOR PATTERN 1 |   |   |
| 1 | TRAVEL DIRECTION |   |   | IMAGE PATTERN 1 |

ITEM NUMBER    ITEM NAME

|   |         | COLOR PATTERN   | TEXT PATTERN | IMAGE PATTERN |
|---|---------|-----------------|--------------|---------------|
| 1 | DOOR R1 | COLOR PATTERN 3 |              |               |
| 2 | DOOR R2 | COLOR PATTERN 3 |              |               |
| 3 | DOOR L1 | COLOR PATTERN 3 |              |               |
| 4 | DOOR L2 | COLOR PATTERN 3 |              |               |

FIG.30

|   |         | COLOR PATTERN    | TEXT PATTERN   | IMAGE PATTERN |
|---|---------|------------------|----------------|---------------|
| 0 | BRAKE   | COLOR PATTERN 4  | TEXT PATTERN 1 |               |
| 1 | TRACTION| COLOR PATTERN 5  | TEXT PATTERN 2 |               |
| 2 | HVAC    | COLOR PATTERN 6  | TEXT PATTERN 3 |               |

FIG.31

| | |
|---|---|
| CAR | ☑ ☑ ☑ ☑ ☑ ☑ ☐ ☐ |
| NUMBER OF DEVICES | 2 |
| LAYOUT SCHEME | ASCENDING ORDER, LATERAL |
| DRAWING COMPONENT NUMBER | 14 |
| FIRST ITEM NUMBER | 0 |
| COLOR PATTERN | COLOR PATTERN 1 |
| TEXT PATTERN | TEXT PATTERN 1 |
| IMAGE PATTERN | IMAGE PATTERN 1 |

FIG.36

|   |         | DATA 1      | DATA 2 | DATA 3 | ... | COMPUTATION FOR DISPLAY |
|---|---------|-------------|--------|--------|-----|-------------------------|
| 1 | DOOR R1 | door[1].R1  |        |        |     | DRAWING DATA IS SET TO 0 WHEN DEVICE OF DATA 1 IS NOT INSTALLED, TO 3 WHEN SIGNAL 1 VALUE IS INVALID, AND TO SIGNAL VALUE WHEN SIGNAL 1 VALUE IS VALID |
| 2 | DOOR R2 | door[1].R2  |        |        |     | SAME AS DOOR R1         |
| 3 | DOOR L1 | door[1].L1  |        |        |     | SAME AS DOOR R1         |
| 4 | DOOR L2 | door[1].L2  |        |        |     | SAME AS DOOR R1         |

FIG.37B

|   |   | \multicolumn{6}{c}{DISPLAYED CAR NUMBER} |
|---|---|---|---|---|---|---|---|
|   |   | 1 | 2 | 3 | 4 | 5 | 6 |
| 1 | DOOR R1 | 1 | 3 | 1 | 2 | 1 | 1 |
| 2 | DOOR R2 | 1 | 1 | 1 | 1 | 1 | 1 |
| 3 | DOOR L1 | 1 | 1 | 1 | 1 | 1 | 1 |
| 4 | DOOR L2 | 3 | 1 | 1 | 1 | 1 | 1 |

FIG.37A
(SIGNAL VALUE)

| DATA 1 | CAR 1 | CAR 2 | CAR 3 | CAR 4 | CAR 5 | CAR 6 |
|---|---|---|---|---|---|---|
| door[1].R1 | 1 | (INVALID) | 1 | 2 | 1 | 1 |
| door[1].R2 | 1 | 1 | 1 | 1 | 1 | 1 |
| door[1].L1 | 1 | 1 | 1 | 1 | 1 | 1 |
| door[1].L2 | (INVALID) | 1 | 1 | 1 | 1 | 1 |

FIG.37C

|   |   | \multicolumn{6}{c}{DISPLAYED CAR NUMBER} |
|---|---|---|---|---|---|---|---|
|   |   | 1 | 2 | 3 | 4 | 5 | 6 |
| 1 | DOOR R1 | 1 | 1 | 2 | 1 | 3 | 1 |
| 2 | DOOR R2 | 1 | 1 | 1 | 1 | 1 | 1 |
| 3 | DOOR L1 | 1 | 1 | 1 | 1 | 1 | 1 |
| 4 | DOOR L2 | 1 | 1 | 1 | 1 | 1 | 3 |

FIG.42

EXAMPLE 1 ⬇

| | 1 | 2 | 3 | 4 | 5 | 6 |
|---|---|---|---|---|---|---|
| DATA | 1 | 2 | 3 | 4 | 5 | 6 |
| CCU[1].DeiverKeyStatus | 1 | 0 | 0 | 0 | 0 | 0 |
| train.global[1].Direction | 1 | | | | | |
| TRAIN_DIRECTION | 1 | | | | | 0 |

EXAMPLE 2 ⬆

| | 6 | 5 | 4 | 3 | 2 | 1 |
|---|---|---|---|---|---|---|
| DATA | 1 | 2 | 3 | 4 | 5 | 6 |
| CCU[1].DeiverKeyStatus | 0 | 0 | 0 | 0 | 0 | 1 |
| train.global[1].Direction | 1 | | | | | |
| TRAIN_DIRECTION | 0 | | | | | 2 |

EXAMPLE 3 ⬆

| | 1 | 2 | 3 | 4 | 5 | 6 |
|---|---|---|---|---|---|---|
| DATA | 1 | 2 | 3 | 4 | 5 | 6 |
| CCU[1].DeiverKeyStatus | 1 | 0 | 0 | 0 | 0 | 0 |
| train.global[1].Direction | 2 | | | | | |
| TRAIN_DIRECTION | 0 | | | | | 2 |

EXAMPLE 4 ⬇

| | 6 | 5 | 4 | 3 | 2 | 1 |
|---|---|---|---|---|---|---|
| DATA | 1 | 2 | 3 | 4 | 5 | 6 |
| CCU[1].DeiverKeyStatus | 0 | 0 | 0 | 0 | 0 | 1 |
| train.global[1].Direction | 2 | | | | | |
| TRAIN_DIRECTION | 0 | | | | | 0 |

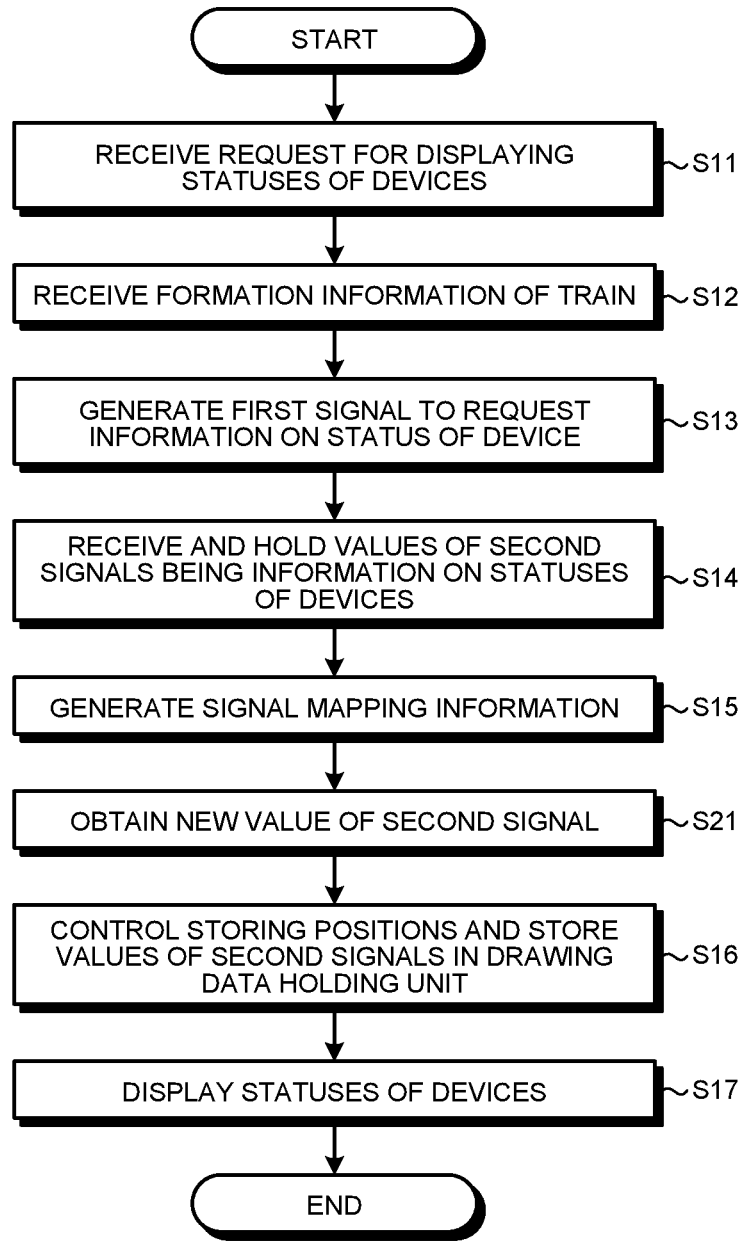

DRAWING COMPONENT GENERATION DEVICE, DISPLAY SYSTEM, AND DRAWING COMPONENT GENERATION METHOD

FIELD

The present invention relates to a drawing component generation device, to a display system, and to a drawing component generation method, for generating a drawing component for use in display of the status of a device installed in a car of a train.

BACKGROUND

An operational state of a device installed in a car of a train or the like is conventionally displayed on a display device installed in the train cab using display components, each of which is a modularized part of display content. Such technology is disclosed in Patent Literature 1.

CITATION LIST

Patent Literature

Patent Literature 1: Japanese Patent Application Laid-open No. 2009-101964

SUMMARY

Technical Problem

However, the foregoing conventional technology requires a user to manually enter necessary information to generate a display component. This presents a problem in that generation of a display component is laborious and time-consuming.

The present invention has been made in view of the foregoing, and it is an object of the present invention to provide a drawing component generation device that allows a reduction in the amount of user operation to generate a drawing component for use in display of the status of a device installed in a car of a train.

Solution to Problem

In order to solve the above-stated problem and achieve the object, the present invention provides a drawing component generation device that generates a drawing component being a modularized part of display content to be displayed on the display screen when a display device installed in a train is to display a status of a device installed in a car of the train on a display screen using the drawing component. The drawing component generation device includes: a reception unit to provide an input screen displaying entries for information for use in generation of the drawing component, based on a train display definition that defines a train formation pattern representing an arrangement of cars in a formation of the train, and on a device layout definition that defines a layout pattern representing a device layout in the car, and to receive an input of information for the entries from a user; and a generation unit to generate the drawing component based on the train display definition, on the device layout definition, on input information being information input from the user on the reception unit, and on a display pattern definition that defines display content relating to the status of the device.

Advantageous Effects of Invention

The present invention provides an advantage in that the drawing component generation device allows a reduction in the amount of user operation to generate a drawing component for use by a display device installed in a train to display the status of a device installed in a car of the train.

BRIEF DESCRIPTION OF DRAWINGS

FIG. 3 is a diagram illustrating an example of modularization, into multiple drawing components, of display content to be displayed on a display screen by the train cab display device according to the first embodiment.

FIG. 4 is a diagram illustrating an example of drawing component 1 displayed by the train cab display device according to the first embodiment.

FIG. 5 is a diagram illustrating an example of drawing table for drawing component 1 held by the train cab display device according to the first embodiment.

FIG. 13 is a diagram illustrating an example provided in tabular form, of the first train formation pattern presented by the train display definition held by the train display definition holding unit of the drawing component generation device according to the first embodiment.

FIG. 14 is a diagram illustrating an example provided in tabular form, of the second train formation pattern presented by the train display definition held by the train display definition holding unit of the drawing component generation device according to the first embodiment.

FIG. 15 is a diagram illustrating a first example of layout pattern presented by a device layout definition held by the device layout definition holding unit of the drawing component generation device according to the first embodiment.

FIG. 16 is a diagram illustrating a second example of layout pattern presented by the device layout definition held by the device layout definition holding unit of the drawing component generation device according to the first embodiment.

FIG. 18 is a diagram illustrating an example of input screen displayed on the display unit by the reception unit of the drawing component generation device according to the first embodiment.

FIG. 19 is a diagram illustrating an example of color patterns held by the generation unit of the drawing component generation device according to the first embodiment.

FIG. 20 is a diagram illustrating an example of image pattern held by the generation unit of the drawing component generation device according to the first embodiment.

FIG. 21 is a diagram illustrating an example of text patterns held by the generation unit of the drawing component generation device according to the first embodiment.

FIGS. 23A to 23C are diagrams illustrating a second example of drawing component generated by the drawing component generation device according to the first embodiment.

FIG. 26 is a diagram illustrating an example of display pattern definition assigned to drawing component 1 to be generated by the generation unit of the drawing component generation device according to the first embodiment.

FIG. 30 is a diagram illustrating an example of display pattern definition assigned to drawing component 3 to be generated by the generation unit of the drawing component generation device according to the first embodiment.

FIG. 31 is a diagram illustrating another example of the input screen displayed on the display unit by the reception unit of the drawing component generation device according to the first embodiment.

FIG. 36 is a diagram illustrating an example of signal definition held for drawing component 2 by the signal definition holding unit of the train cab display device according to the second embodiment.

FIGS. 37A to 37C are diagrams illustrating an example of storage method when the signal data storage unit stores values of second signals for drawing component 2 in a drawing table of the drawing data holding unit in the train cab display device according to the second embodiment.

FIG. 42 is a diagram illustrating an example of the orientation of a train and the travel direction of the train displayed by the train cab display device according to the third embodiment.

FIG. 43 is a flowchart illustrating an operation of displaying the statuses of devices installed in each of the cars of a train performed by the train cab display device according to the third embodiment.

DESCRIPTION OF EMBODIMENTS

A drawing component generation device, a display system, and a drawing component generation method according to embodiments of the present invention will be described in detail below with reference to the drawings. Note that these embodiments are not intended to limit the scope of this invention.

First Embodiment

Figure 1:
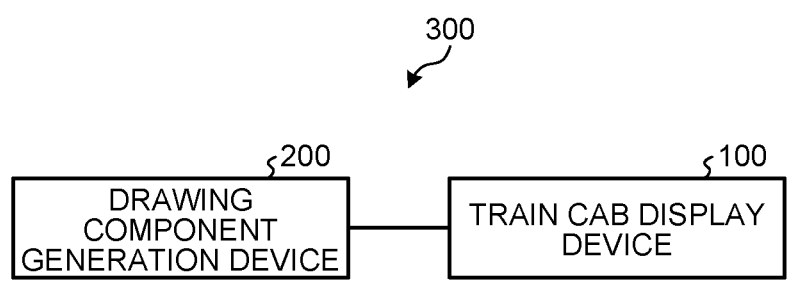
FIG. 1 is a block diagram illustrating an example configuration of a display system according to a first embodiment.

FIG. 1 is a block diagram illustrating an example configuration of a display system 300 according to a first embodiment of the present invention. The display system 300 includes a train cab display device 100 and a drawing component generation device 200. The train cab display device 100 is a display device that is installed in the train cab (not illustrated) and displays statuses of respective devices installed in each of the cars constituting the train and the like on a display screen. The phrase "devices installed in each of the cars" refers to, for example, a door (DOOR), a brake (BRAKE), a traction (TRACTION), a heating ventilating air conditioning (HVAC), and the like. The operation performed by the train cab display device 100 of displaying the statuses of devices on a display screen may hereinafter also be described as "the train cab display device 100 draws the statuses of devices on a display screen". For displaying the statuses of devices and the like on a display screen, the train cab display device 100 performs a drawing process using multiple drawing components, each of which is a modularized part of display content to be displayed on a display screen.

When the train cab display device 100 is to display the statuses of devices installed in a car of the train on a display screen using drawing components, the drawing component generation device 200 generates the drawing components for use by the train cab display device 100. The drawing component generation device 200 provides a user with an input screen that displays entries for information for use in generation of a drawing component, receives inputs of information for the entries from the user, and generates the drawing component to be used in the train cab display device 100. The drawing component generation device 200 may be permanently installed in the train together with the train cab display device 100, or may be detachable from the train cab display device 100 and be connected to the train cab display device 100 only when the drawing component generation device 200 has generated or modified a drawing component.

Usage of the drawing components generated by the drawing component generation device 200 in the train cab display device 100 will now be specifically described as an overview of process performed by the train cab display device 100 to display the statuses of devices on a display screen using the multiple drawing components.

Figure 2:
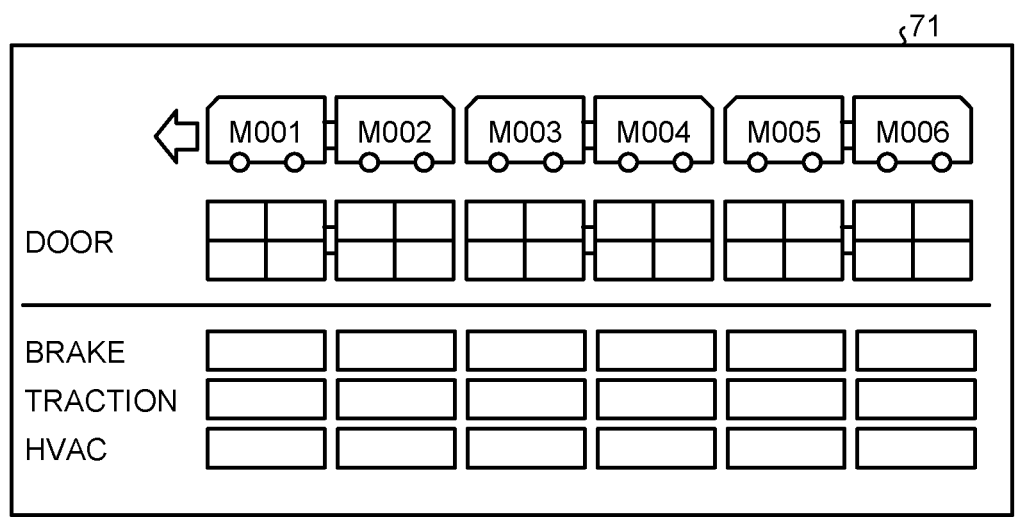
FIG. 2 is a diagram illustrating an example of display format for the display of the statuses of devices on a display screen provided by the train cab display device according to the first embodiment.

FIG. 2 is a diagram illustrating an example of display format for the display of the statuses of devices on a display screen 71 provided by the train cab display device 100 according to the first embodiment. The illustration in FIG. 2 assumes a train having a six-car formation by way of example. As illustrated in FIG. 2, the train cab display device 100 displays, on the display screen 71, the six cars reflecting the train formation and an arrow indicating the travel direction. The train cab display device 100 also displays, on the display screen 71, the statuses of respective doors installed in each of the cars as the statuses of devices. The illustration in FIG. 2 assumes, by way of example, that each of the cars has two doors in each of the right and left sides, i.e., four doors in total. The train cab display device 100 further displays, on the display screen 71, a use status, a fault status, or the like of each of the brakes, of the tractions, and of the HVACs as the statuses of devices.

The train cab display device 100 provides display control through modularization of the display screen 71 illustrated in FIG. 2 into multiple drawing components rather than displaying as an integrated unit. FIG. 3 is a diagram illustrating an example of modularization, into multiple drawing components, of display content to be displayed on the display screen 71 by the train cab display device 100 according to the first embodiment. FIG. 3 illustrates the display screen 71 illustrated in FIG. 2 as being formed of three drawing components by way of example. Drawing component 1 is a component for displaying the status of the train formation. Drawing component 2 is a component for displaying the statuses of the doors. Drawing component 3 is a component for displaying the statuses of the brakes, of the tractions, and of the HVACs. As illustrated in FIG. 3, the content displayed on the display screen 71 is modularized such that one drawing component is used to draw the entire six-car formation of the train, that is, modularized on a per-train basis.

The train cab display device 100 holds drawing data in tabular form having rows corresponding to respective cars and columns corresponding to respective car properties on a per-drawing component basis. The drawing data is information on the statuses of respective devices obtained by the train cab display device 100 from devices installed in that car itself and in other cars. The train cab display device 100 performs a drawing process based on the drawing data, and provides a display on the display screen 71 as illustrated in FIGS. 2 and 3. Description will be presented below specifically of the drawing components to be displayed on the display screen 71 by the train cab display device 100, and of the drawing data held in the drawing table for each drawing component by the train cab display device 100 during this operation.

FIG. 4 is a diagram illustrating an example of drawing component 1 displayed by the train cab display device 100 according to the first embodiment. Drawing component 1 of FIG. 4 has a solid arrow indicating that the train travels to the left. FIG. 4 illustrates an example in which the leading car is the car M001, and the train cab display device 100 installed in the leading car displays that car on the left. Note that when the same train changes the travel direction, causing the last car to become the car M001, and the train cab display device 100 installed in the last car now displays that car on the left, the train travels in the direction indicated by the dotted arrow. In addition, drawing component 1 of FIG. 4 provides a different display depending on whether there is a fault, and indicates that the cars M003 and M006 have a fault. The method of displaying differently is, for example, to change the display color, but other method may be used. As described later herein, the drawing component generation device 200 is capable of setting how each drawing component is to be displayed.

FIG. 5 is a diagram illustrating an example of a drawing table 22a for drawing component 1 held by the train cab display device 100 according to the first embodiment. The drawing table 22a for drawing component 1 illustrated in FIG. 5 holds drawing data for the six cars. In FIG. 5, a cell of presence or absence of a fault contains drawing data of "1" for a car without a fault, or drawing data of "2" for a car having a fault. In addition, in FIG. 5, a cell of travel direction contains drawing data of "1" indicating the left. In the example of FIG. 5, a cell of travel direction will contain drawing data of "2" to indicate the right, and drawing data of "0" when there is no travel direction to indicate. The table of FIG. 5 assumes that the displayed car numbers from 1 to 6 respectively correspond to the cars M001 to M006 of the train illustrated in FIG. 4. This applies throughout the following description. The train cab display device 100 displays, on the display screen 71, drawing component 1 for the six-car train illustrated in FIG. 4 based on the drawing data in the drawing table illustrated in FIG. 5. Note that in FIG. 5, the values "0" and "1" in the left column are numbers for identifying a group of information displayed in the drawing component, and are each referred to as item number. In addition, the titles "presence or absence of fault" and "travel direction" in FIG. 5 represent the types of information displayed in the drawing component, and are each referred to as item name. An item name may represent the status of a device or a device itself. This applies throughout the following description.

Figures 6, 7:
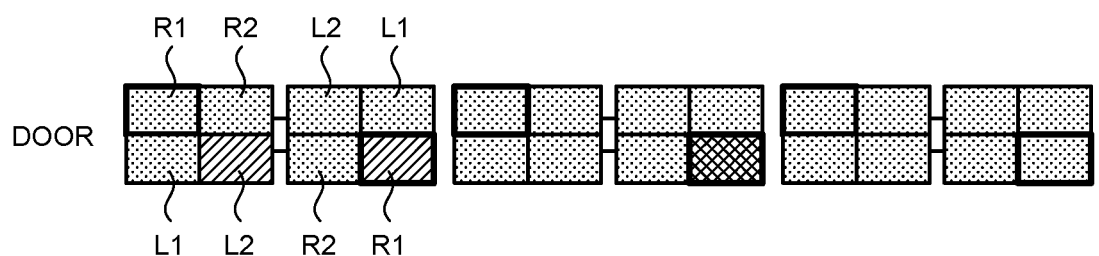
FIG. 6 is a diagram illustrating an example of drawing component 2 displayed by the train cab display device according to the first embodiment.
FIG. 7 is a diagram illustrating an example of drawing table for drawing component 2 held by the train cab display device according to the first embodiment.

FIG. 6 is a diagram illustrating an example of drawing component 2 displayed by the train cab display device 100 according to the first embodiment. Drawing component 2 of FIG. 6 indicates that a door L2 of the car M001 and a door R1 of the car M002, of the cars M001 to M006, are faulty. Drawing component 2 of FIG. 6 also indicates that a door R1 of the car M004 has a sign of fault. Drawing component 2 of FIG. 6 further indicates that the other doors are normal. The information on the status of a door may be information on the open-close status instead of or in addition to information on whether there is a fault.

FIG. 7 is a diagram illustrating an example of a drawing table 22b for drawing component 2 held by the train cab display device 100 according to the first embodiment. The drawing table 22b for drawing component 2 illustrated in FIG. 7 holds drawing data for the six cars. In FIG. 7, the cells for the doors R1, the doors R2, the doors L1, and the doors L2 contain drawing data of "1" for a normal door, "2" for a door having a sign of fault, and "3" for a faulty door. The train cab display device 100 displays, on the display screen 71, drawing component 2 with respect to the doors of the six-car train illustrated in FIG. 6 based on the drawing data in the drawing table illustrated in FIG. 7.

Figure 8:
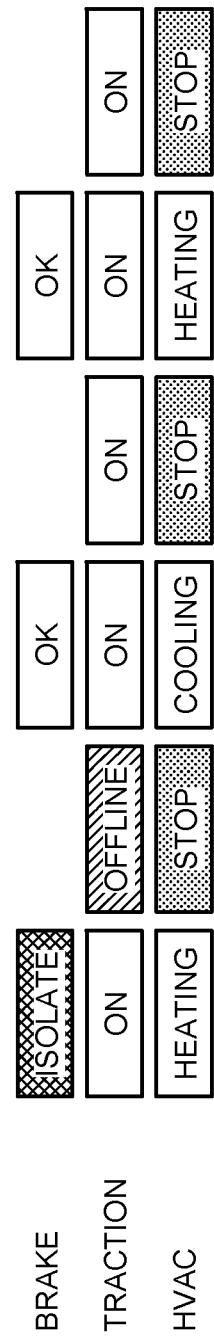
FIG. 8 is a diagram illustrating an example of drawing component 3 displayed by the train cab display device according to the first embodiment.

FIG. 8 is a diagram illustrating an example of drawing component 3 displayed by the train cab display device 100 according to the first embodiment. Drawing component 3 of FIG. 8 illustrates the operational state and the like of devices installed in each of the cars M001 to M006.

Figures 9, 10:
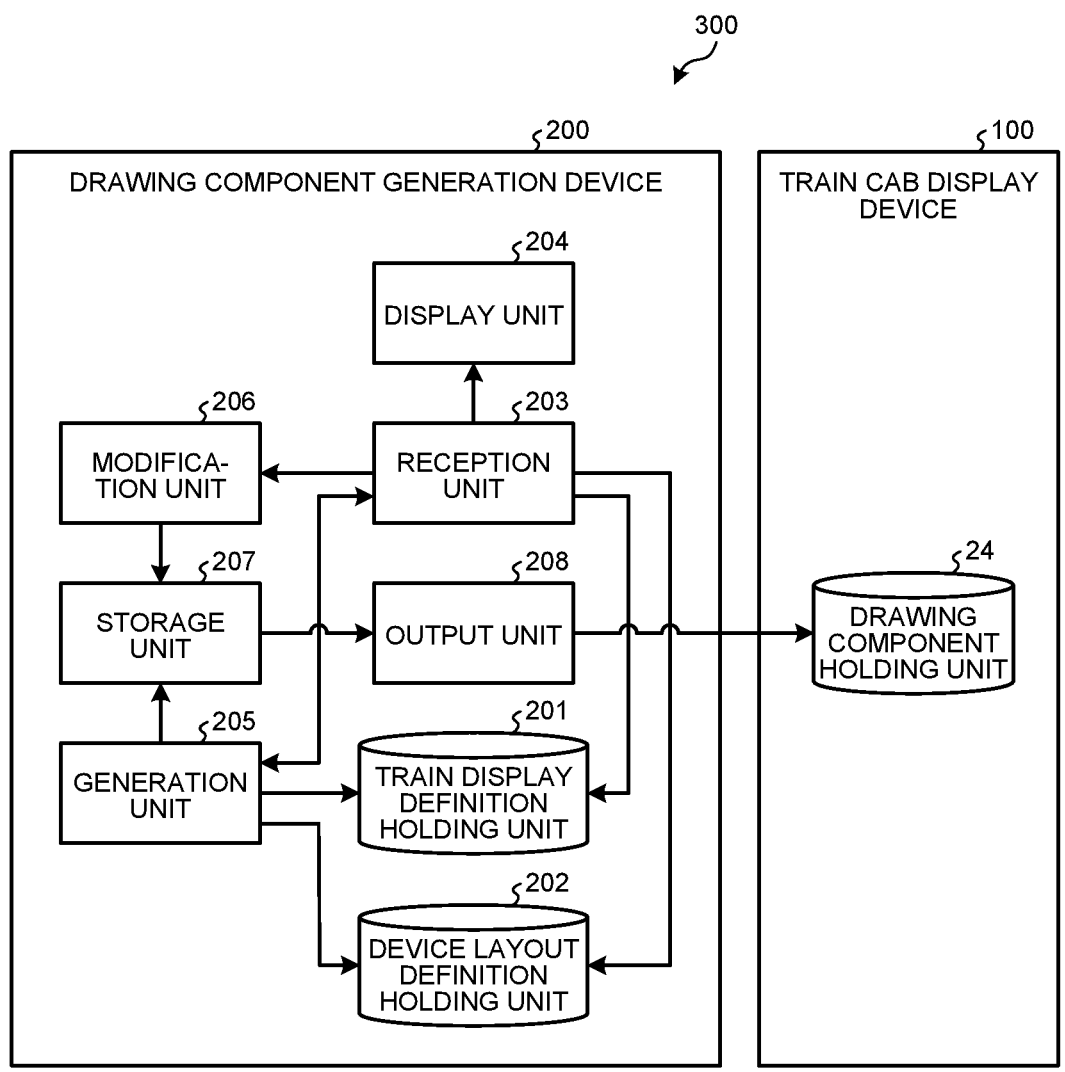
FIG. 9 is a diagram illustrating an example of drawing table for drawing component 3 held by the train cab display device according to the first embodiment.
FIG. 10 is a block diagram illustrating an example configuration of the display system including the drawing component generation device according to the first embodiment.

FIG. 9 is a diagram illustrating an example of a drawing table 22c for drawing component 3 held by the train cab display device 100 according to the first embodiment. The drawing table 22c for drawing component 3 illustrated in FIG. 9 holds drawing data for the six cars. In FIG. 9, the cells of BRAKE contain drawing data of "0" for a car having no brake, "1" for a car having the brake in normal operation, and "2" for a car having the brake in an isolation state. In addition, in FIG. 9, the cells of TRACTION contain drawing data of "0" for a car having no traction, "1" for a car having an ON traction, and "2" for a car having an OFFLINE traction. Moreover, in FIG. 9, the cells of HVAC contain drawing data of "0" for a car having no HVAC, "1" for a STOP car not being air-conditioned, "2" for a HEATING car being heated, and "3" for a COOLING car being cooled. The train cab display device 100 displays, on the display screen 71, drawing component 3 with respect to devices such as the brakes of the six-car train illustrated in FIG. 8 based on the drawing data in the drawing table 22c illustrated in FIG. 9.

The drawing component generation device 200 generates a drawing component to be used as described above in the train cab display device 100. A configuration and an operation of the drawing component generation device 200 will now be described. FIG. 10 is a block diagram illustrating an example configuration of the display system 300 including the drawing component generation device 200 according to the first embodiment. FIG. 10 also illustrates the train cab display device 100 connected to the drawing component generation device 200. The drawing component generation device 200 includes a train display definition holding unit 201, a device layout definition holding unit 202, a reception unit 203, a display unit 204, a generation unit 205, a modification unit 206, a storage unit 207, and an output unit 208.

The train display definition holding unit 201 holds a train display definition that defines a train formation pattern representing the arrangement of the cars relating to the train formation. Specifically, the train display definition provides the maximum number of displayed cars, which is the maximum number of cars to be displayed on the display screen 71 of the train cab display device 100; the configuration of the formation of the cars of the train for the maximum number of displayed cars; and the orientation of each of the cars. A conventional drawing component is generated such that the user manually generates and arranges elements that are each a constituent, and generates setting data of the cars to be displayed and the like for each of the elements by manual input. In this regard, elements that display the same status of device will be set with similar setting. In addition, the layout pattern has regularity such as a linear lateral arrangement of elements that display the same type of devices. Such regularity can in general be standardized into patterns depending on the formation of the train. A train is constituted by multiple train-units, and a train-unit is constituted by multiple cars. The train, the train-units, and the cars each have an orientation. The orientation of a train is either forward or reverse. The orientation of a train-unit is either forward or reverse depending on the orientation of the train, and the orientation of a car is either forward or reverse depending on the orientation of the train-unit.

Figure 11:
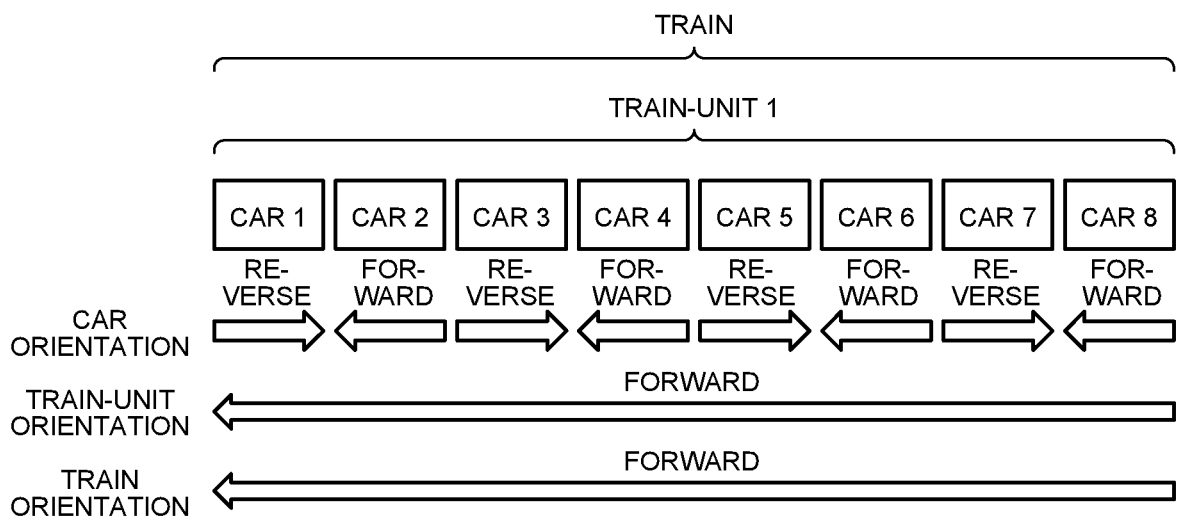
FIG. 11 is a diagram illustrating an example of a first train formation pattern presented by the train display definition held by the train display definition holding unit of the drawing component generation device according to the first embodiment.
Figure 12:
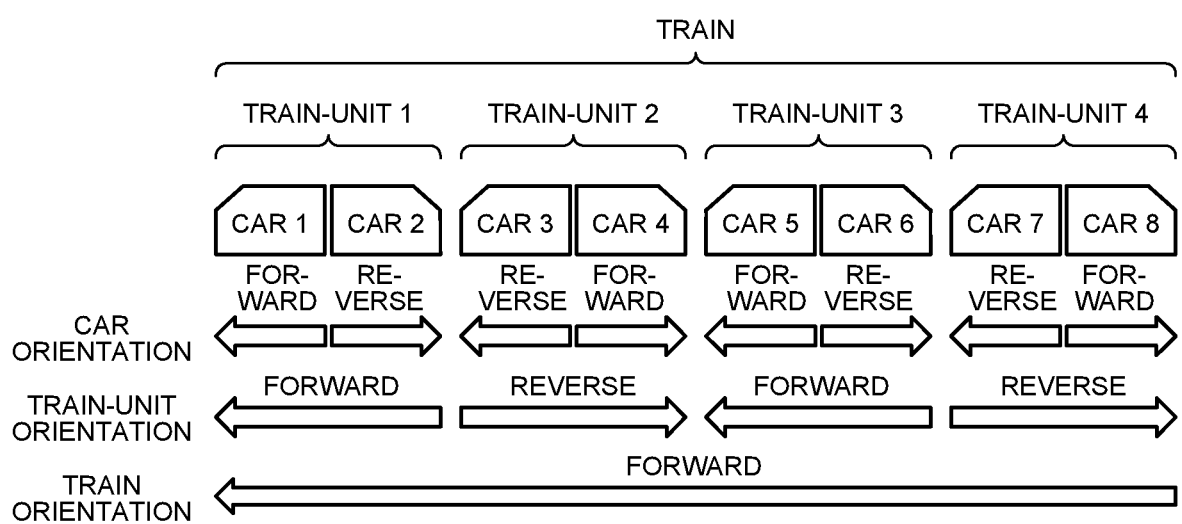
FIG. 12 is a diagram illustrating an example of a second train formation pattern presented by the train display definition held by the train display definition holding unit of the drawing component generation device according to the first embodiment.

FIG. 11 is a diagram illustrating an example of a first train formation pattern presented by the train display definition held by the train display definition holding unit 201 of the drawing component generation device 200 according to the first embodiment. The first train formation pattern illustrated in FIG. 11 is a form of train in which one train-unit is constituted by eight cars 1 to 8, and the train is constituted by the one train-unit. The first train formation pattern indicates that the cars are connected to each other in alternately different orientations. FIG. 12 is a diagram illustrating an example of a second train formation pattern presented by the train display definition held by the train display definition holding unit 201 of the drawing component generation device 200 according to the first embodiment. The second train formation pattern illustrated in FIG. 12 is a form of train in which one train-unit is constituted by two cars, and the train is constituted by four train-units. The second train formation pattern indicates that the cars are connected to each other such that they face away from each other in each of the train-units, and the train-units are connected to each other in alternately different orientations. The train formation pattern may assume a variety of patterns, and is not limited to the train formation patterns of the examples of FIGS. 11 and 12. The train display definition holding unit 201 may hold the information of the train formation patterns illustrated in FIGS. 11 and 12 in tabular form. FIG. 13 is a diagram illustrating an example provided in tabular form, of the first train formation pattern presented by the train display definition held by the train display definition holding unit 201 of the drawing component generation device 200 according to the first embodiment. FIG. 14 is a diagram illustrating an example provided in tabular form, of the second train formation pattern presented by the train display definition held by the train display definition holding unit 201 of the drawing component generation device 200 according to the first embodiment. The orientation of the train is not included in the tables of FIGS. 13 and 14 because of the same orientation, but information on the orientation of the train may also be included in the tables of FIGS. 13 and 14.

The device layout definition holding unit 202 holds a device layout definition that defines a layout pattern representing the device layout in a car. Specifically, the device layout definition is a layout pattern of devices when one car includes multiple devices to be displayed. As described above, the layout pattern of elements each representing a device has regularity.

FIG. 15 is a diagram illustrating a first example of the layout pattern presented by the device layout definition held by the device layout definition holding unit 202 of the drawing component generation device 200 according to the first embodiment. The left column in FIG. 15 provides, in order from top to bottom, a first layout pattern, a second layout pattern, a third layout pattern, and a fourth layout pattern. In the left column in FIG. 15, a dotted rectangle represents a car, and the numbers 1 and 2 are numbers for identifying the devices in that car. A number for identifying a device corresponds to the item number described above. The layout scheme in the right column in FIG. 15 describes the layout of the devices of each layout pattern. When the item numbers are assigned to respective devices in order from front to back in each of the car, the second layout pattern corresponds to the train having the first train formation pattern illustrated in FIG. 11, and the third layout pattern corresponds to the train having the second train formation pattern illustrated in FIG. 12. Note that the device layout scheme in the lateral direction is merely by way of example, and a device layout scheme in the vertical direction may also be used.

FIG. 16 is a diagram illustrating a second example of the layout pattern presented by the device layout definition held by the device layout definition holding unit 202 of the drawing component generation device 200 according to the first embodiment. The left column in FIG. 16 provides, in order from top to bottom, a fifth layout pattern and a sixth layout pattern. In the left column in FIG. 16, a dotted rectangle represents a car, and the numbers 1 to 6 are numbers for identifying the devices in that car. A number for identifying a device corresponds to the item number described above. The layout scheme in the right column in FIG. 16 describes the layout of the devices of each layout pattern. In a case in which the devices cannot be arranged in one lateral direction as illustrated in FIG. 15, the devices may be arranged in a clockwise direction from upper left as the fifth layout pattern, or may be arranged in a staggered manner in order from upper left to bottom, then shifting in the lateral direction, and then from top to bottom as the sixth layout pattern.

Figure 17:
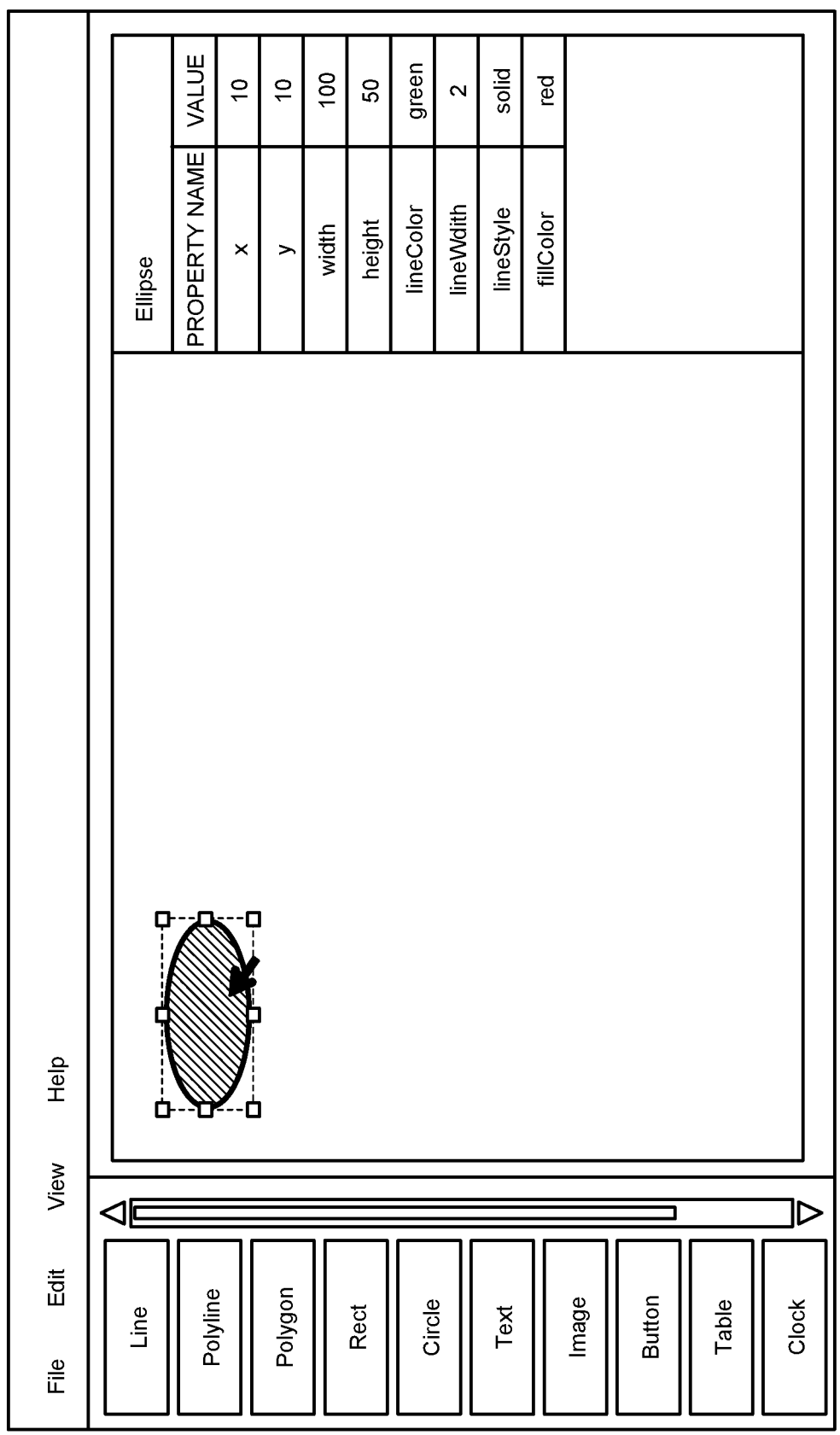
FIG. 17 is a diagram illustrating an example of display screen displayed on a display unit during a process of generation of a drawing component performed by a reception unit of the drawing component generation device according to the first embodiment.

The reception unit 203 receives an operation of generation of a drawing component from the user. FIG. 17 is a diagram illustrating an example of the display screen 71 displayed on the display unit 204 during a process of generation of a drawing component performed by the reception unit 203 of the drawing component generation device 200 according to the first embodiment. The display screen 71 illustrated in FIG. 17 is a typical display screen 71 displayed during generation of a drawing component. The user selects an element such as a line, a polyline, a rectangle, or a text from the left pane, i.e., area, illustrated in FIG. 17, and places the element on the center pane. In FIG. 17, the right pane displays the property list of the element selected by the user.

When a drawing component is to be generated using the element selected by the user, the reception unit 203 generates an input screen that displays entries for information for use in generation of the drawing component, based on the train display definition held by the train display definition holding unit 201 and on the device layout definition held by the device layout definition holding unit 202. The reception unit 203 displays the input screen generated, on the display unit 204, thus to present the input screen to the user. FIG. 18 is a diagram illustrating an example of the input screen displayed on the display unit 204 by the reception unit 203 of the drawing component generation device 200 according to the first embodiment. The reception unit 203 displays, on the display unit 204, and thus presents to the user, the input screen, i.e., an entry of "car" to specify the car(s) including the device(s) to be displayed in that drawing component; an entry of "number of devices" to indicate the number of devices installed in each of the car(s) specified above; an entry of "layout scheme" to indicate the layout pattern of the devices; an entry of "drawing component number", which is identification information for identifying the drawing component; and an entry of "first item number" to specify the first number of the item numbers identifying the status displayed in that drawing component, as the entries for information for use in generation of that drawing component. The reception unit 203 receives an input of information for each entry from the user via the input screen displayed on the display unit 204. The reception unit 203 outputs the information input from the user, i.e., input information, to the generation unit 205.

The display unit 204 displays the input screen generated by the reception unit 203. The display unit 204 may display the drawing component generated by the generation unit 205 described later. Note that in a case in which the drawing component generation device 200 is capable of displaying the display content on another device such as the train cab display device 100 or a personal computer, the drawing component generation device 200 may be configured not to include the display unit 204.

The generation unit 205 generates a drawing component based on the train display definition held by the train display definition holding unit 201, on the device layout definition held by the device layout definition holding unit 202, on the input information having been input from the user on the reception unit 203, and on a display pattern definition that defines the display content relating to the statuses of devices. A detailed operation of the generation unit 205 will be described later. The generation unit 205 stores the drawing component generated, in the storage unit 207.

When the reception unit 203 receives input information different from the input information received upon generation with respect to a drawing component stored in the storage unit 207, the modification unit 206 modifies the drawing component associated with the input information received and stored in the storage unit 207. The modification unit 206 stores the drawing component modified, in the storage unit 207.

The storage unit 207 stores the drawing component generated by the generation unit 205 and the drawing component modified by the modification unit 206.

The output unit 208 outputs the drawing component stored in the storage unit 207 to a drawing component holding unit 24 included in the train cab display device 100.

An operation of the generation unit 205 will now be described in detail. The display pattern definition held by the generation unit 205 is a definition of display content dependent on the statuses of respective devices obtained by the train cab display device 100. The display pattern definition is set in advance by the user in the generation unit 205 of the drawing component generation device 200. Note that the generation unit 205 may store in advance the display pattern definition in the storage unit 207.

The types of the display pattern definition include a color pattern, an image pattern, a text pattern, and the like. FIG. 19 is a diagram illustrating an example of color patterns held by the generation unit 205 of the drawing component generation device 200 according to the first embodiment. The display content, i.e., a set of colors, is defined therein for each color pattern with respect to the drawing data that indicates the status of a device obtained by the train cab display device 100. For example, it is indicated that when color pattern 1 is set, a drawing data value of 2 causes the portion corresponding to the applicable device in the drawing component to be displayed in red. The generation unit 205 is capable of generating a drawing component that allows the train cab display device 100 to provide a display in a display color dependent on the status of a device based on one of the color patterns included in the display pattern definition. That is, the generation unit 205 generates a drawing component that is set with display colors dependent on the respective statuses of devices.

FIG. 20 is a diagram illustrating an example of image pattern held by the generation unit 205 of the drawing component generation device 200 according to the first embodiment. The display content, i.e., a set of images, is defined therein for each image pattern with respect to the drawing data that indicates the status of a device obtained by the train cab display device 100. For example, it is indicated that when image pattern 1 is set, a drawing data value of 1 causes a left arrow to be displayed in the portion corresponding to the applicable device in the drawing component. The generation unit 205 is capable of generating a drawing component that allows the train cab display device 100 to display a display image dependent on the status of a device based on the image pattern included in the display pattern definition. That is, the generation unit 205 generates a drawing component that is set with a display image dependent on the status of device.

FIG. 21 is a diagram illustrating an example of text patterns held by the generation unit 205 of the drawing component generation device 200 according to the first embodiment. The display content, i.e., a set of texts, is defined therein for each text pattern with respect to the drawing data that indicates the status of a device obtained by the train cab display device 100. For example, it is indicated that when text pattern 1 is set, a drawing data value of 1 causes a text of "OK" to be displayed in the portion corresponding to the applicable device in the drawing component. The generation unit 205 is capable of generating a drawing component that allows the train cab display device 100 to display a displayed text dependent on the status of a device based on one of the text patterns included in the display pattern definition. That is, the generation unit 205 generates a drawing component that is set with displayed texts dependent on the respective statuses of devices.

Figures 22A, 22B, 22C:
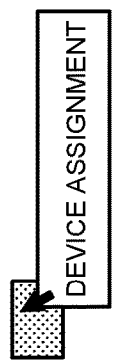
FIGS. 22A to 22C are diagrams illustrating a first example of drawing component generated by the drawing component generation device according to the first embodiment.

FIGS. 22A to 22C are diagrams illustrating a first example of drawing component generated by the drawing component generation device 200 according to the first embodiment. For example, upon reception of a request for "device assignment" through a user operation such as a double click or a right click for the element selected in the display screen 71 illustrated in FIG. 17 described above (FIG. 22A), the reception unit 203 displays the input screen illustrated in FIG. 18 on the display unit 204. The reception unit 203 outputs the input information input from the user through the input screen illustrated in FIG. 22B, to the generation unit 205. The generation unit 205 generates the drawing component illustrated in FIG. 22C based on the input information illustrated in FIG. 22B. The drawing component illustrated in FIG. 22C is a drawing component that allows the statuses of twelve respective devices to be displayed in total for the six cars in a case in which two devices are installed in each of the cars. As illustrated in FIG. 22C, each device has been set with the drawing component number, the displayed car number indicating the display position of the car in which the device is installed, and the item number, each dependent on the input information illustrated in FIG. 22B. The generation unit 205 copies the element selected in the display screen 71 illustrated in FIG. 17, arranges in alignment with one another the copied elements according to the positions for the element selected in the display screen 71 illustrated in FIG. 17, and thus generates a drawing component including the elements each set with the input information illustrated in FIG. 22B. The user further specifies, via the reception unit 203, the display content presented by the display pattern definition, for the item numbers illustrated in FIG. 22C. The generation unit 205 is capable of setting a display content associated with the status of device corresponding to each item number for the drawing component based on the information of the display pattern definition received by the reception unit 203. Note that the user may specify only one display pattern or two or more display patterns for one device, i.e., for one item number.

Figures 23A, 23B, 23C:
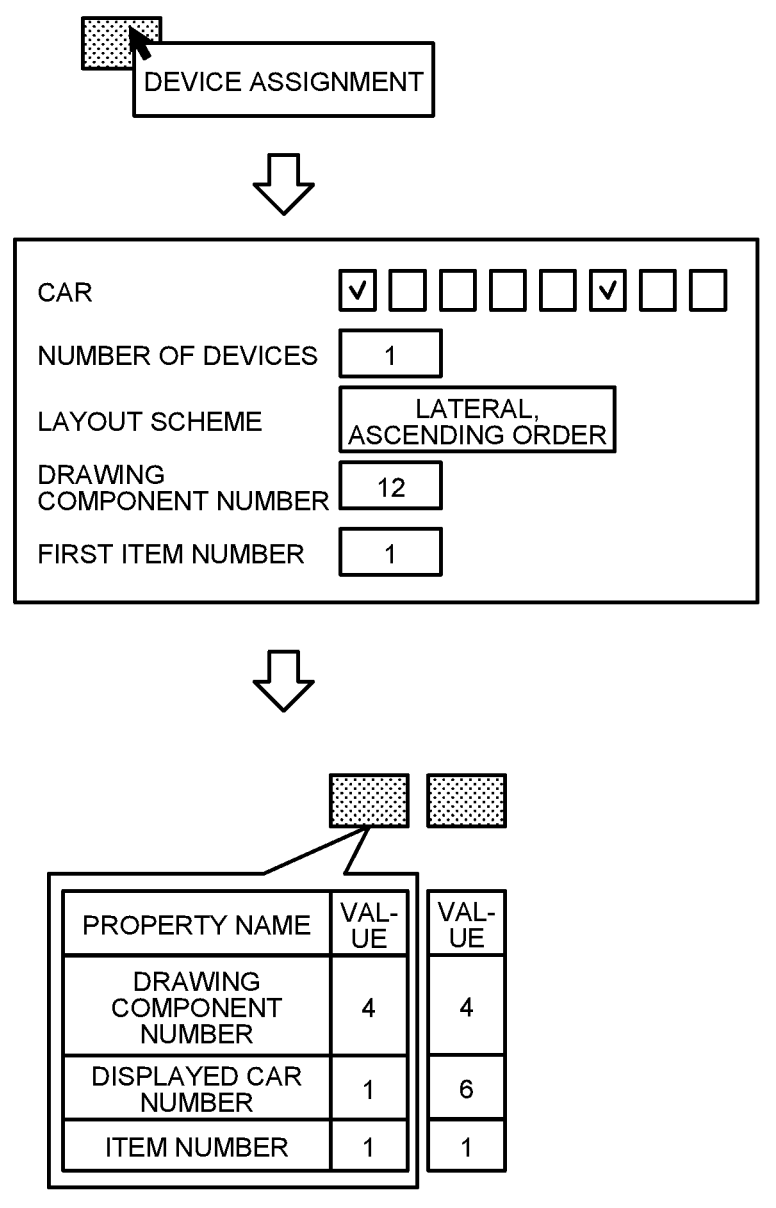

FIGS. 23A to 23C are diagrams illustrating a second example of drawing component generated by the drawing component generation device 200 according to the first embodiment. Similarly to the foregoing case of FIGS. 22A to 22C, upon reception of a request for "device assignment" for the element selected (FIG. 23A), the reception unit 203 displays the input screen illustrated in FIG. 18 on the display unit 204. The reception unit 203 outputs the input information input from the user through the input screen illustrated in FIG. 23B, to the generation unit 205. The generation unit 205 generates the drawing component illustrated in FIG. 23C based on the input information illustrated in FIG. 23B. The drawing component illustrated in FIG. 23C is a drawing component that allows the statuses of two respective devices to be displayed in total for two cars in a case in which one device is installed in each of two cars specified. The drawing component illustrated in FIG. 23C specifies, for example, the leading and last cars of the train, and is thus used to display the travel direction of the train.

Figure 24A:
FIGS. 24A to 24C are diagrams illustrating a third example of drawing component generated by the drawing component generation device according to the first embodiment.
Figure 24B:
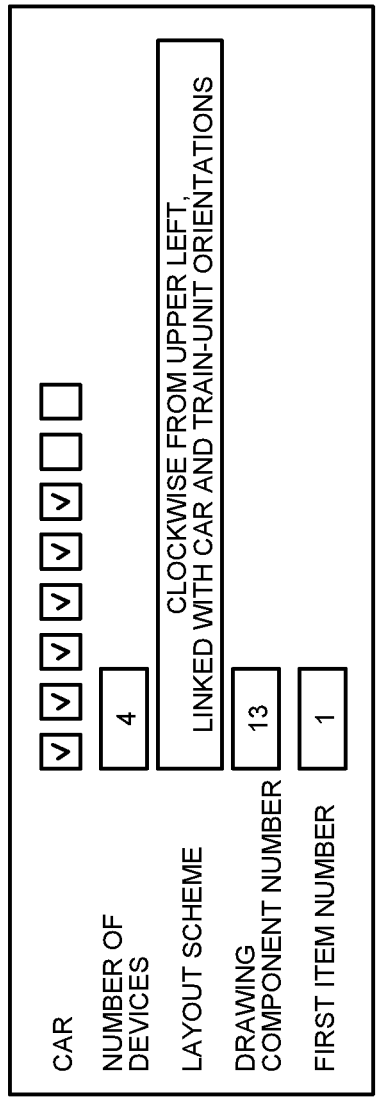
Figure 24C:
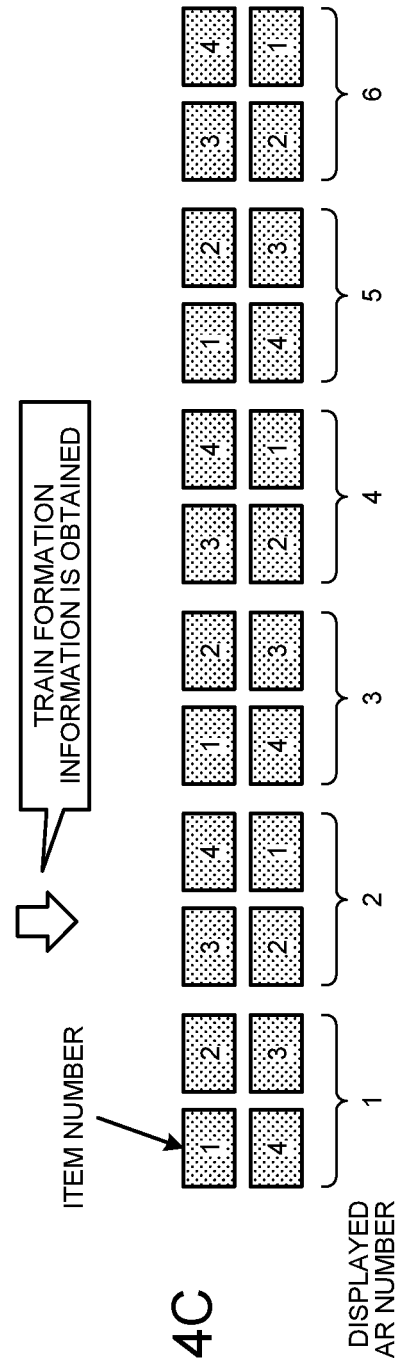

FIGS. 24A to 24C are diagrams illustrating a third example of drawing component generated by the drawing component generation device 200 according to the first embodiment. Similarly to the foregoing case of FIGS. 22A to 22C, upon reception of a request for "device assignment" for the element selected (FIG. 24A), the reception unit 203 displays the input screen illustrated in FIG. 18 on the display unit 204. The reception unit 203 outputs the input information input from the user through the input screen illustrated in FIG. 24B, to the generation unit 205. The generation unit 205 obtains train formation information from the train display definition holding unit 201, and generates the drawing component illustrated in FIG. 24C based on the input information illustrated in FIG. 24B. The drawing component illustrated in FIG. 24C is a drawing component that allows the statuses of 24 respective devices to be displayed in total for the six cars in a case in which four devices are installed in one car. The drawing component illustrated in FIG. 24C is used, for example, to display the statuses of the doors installed in each of the cars of the train.

Figure 25:
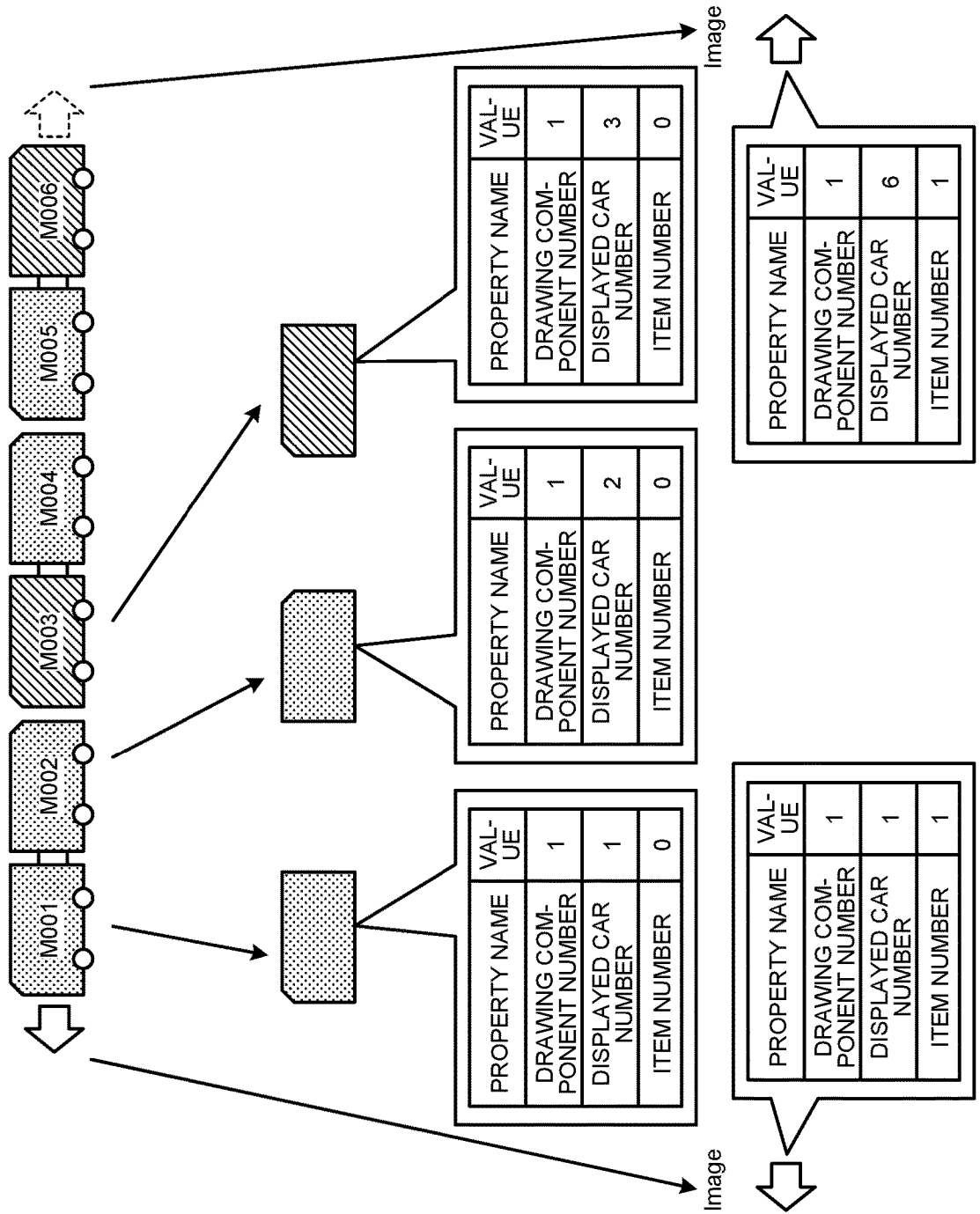
FIG. 25 is a diagram illustrating drawing component 1 generated by the generation unit of the drawing component generation device according to the first embodiment.

A case of generation of each of the drawing components illustrated in FIG. 3 will now be specifically described. FIG. 25 is a diagram illustrating drawing component 1 generated by the generation unit 205 of the drawing component generation device 200 according to the first embodiment. The illustration in FIG. 25 assumes a drawing component for displaying whether there is a fault in a car and the travel direction of the train. The generation unit 205 can generate drawing component 1 illustrated in FIG. 25 by using the input information when the number of devices in the foregoing input screen of FIG. 22B is "1", and using the foregoing input information of FIG. 23B. FIG. 26 is a diagram illustrating an example of display pattern definition assigned to drawing component 1 to be generated by the generation unit 205 of the drawing component generation device 200 according to the first embodiment. The user assigns at least one display pattern defined in the display pattern definition to each item number. The generation unit 205 receives, via the reception unit 203, setting relating to the display pattern definition from the user. FIG. 26 illustrates an example in which color pattern 1 is assigned to item number 0, and image pattern 1 is assigned to item number 1. Note that it is sufficient that a display pattern be assigned to each item number of drawing component 1, and the user does not need to set an item name. This also applies throughout the following description. In addition, item number 0 has no setting of text pattern or image pattern, and item number 1 has no setting of color pattern or text pattern. In this case, a value "0" may be input thereto which indicates no setting. This also applies throughout the following description. In a case in which the drawing data illustrated in FIG. 5 is obtained, the train cab display device 100 can provide the display as illustrated in FIG. 25 using drawing component 1. Specifically, in FIG. 25, the train cab display device 100 displays the cars M001, M002, M004, and M005 having no fault in green, and displays the cars M003 and M006 having a fault in red. In addition, in FIG. 25, the train cab display device 100 displays a left arrow indicating the travel direction of the train, on the left side of the car M001.

Figures 27, 28:
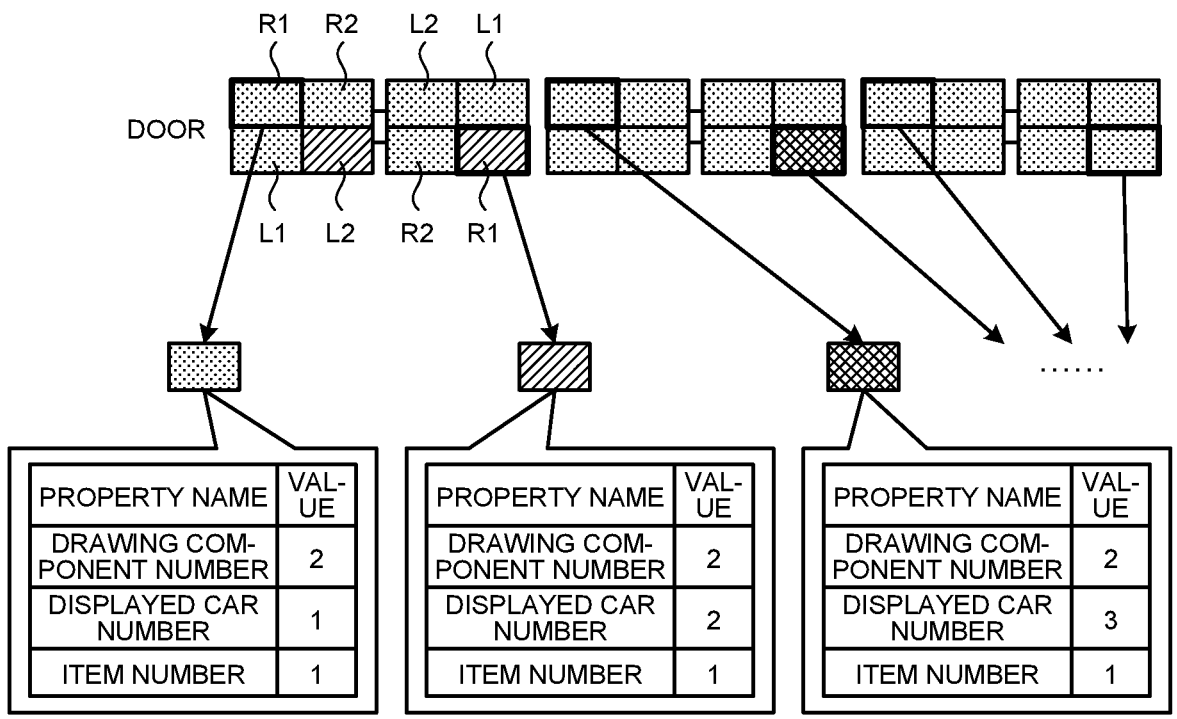
FIG. 27 is a diagram illustrating drawing component 2 generated by the generation unit of the drawing component generation device according to the first embodiment.
FIG. 28 is a diagram illustrating an example of display pattern definition assigned to drawing component 2 to be generated by the generation unit of the drawing component generation device according to the first embodiment.

FIG. 27 is a diagram illustrating drawing component 2 generated by the generation unit 205 of the drawing component generation device 200 according to the first embodiment. The illustration in FIG. 27 assumes a drawing component for displaying the statuses of the doors in each of the cars. The generation unit 205 can generate drawing component 2 illustrated in FIG. 27 by using the foregoing input information of FIG. 24B. FIG. 28 is a diagram illustrating an example of display pattern definition assigned to drawing component 2 to be generated by the generation unit 205 of the drawing component generation device 200 according to the first embodiment. The user assigns at least one display pattern defined in the display pattern definition to each item number. The generation unit 205 receives, via the reception unit 203, setting relating to the display pattern definition from the user. FIG. 28 illustrates an example in which color pattern 3 is assigned to item numbers 1 to 4. In a case in which the drawing data illustrated in FIG. 7 is obtained, the train cab display device 100 can provide the display as illustrated in FIG. 27 using drawing component 2. Specifically, in FIG. 27, the train cab display device 100 displays the door indicated by L2 of displayed car number 1 and the door indicated by R1 of displayed car number 2 in red, displays the door indicated by R1 of displayed car number 4 in yellow, and displays the other doors in green.

Figure 29:
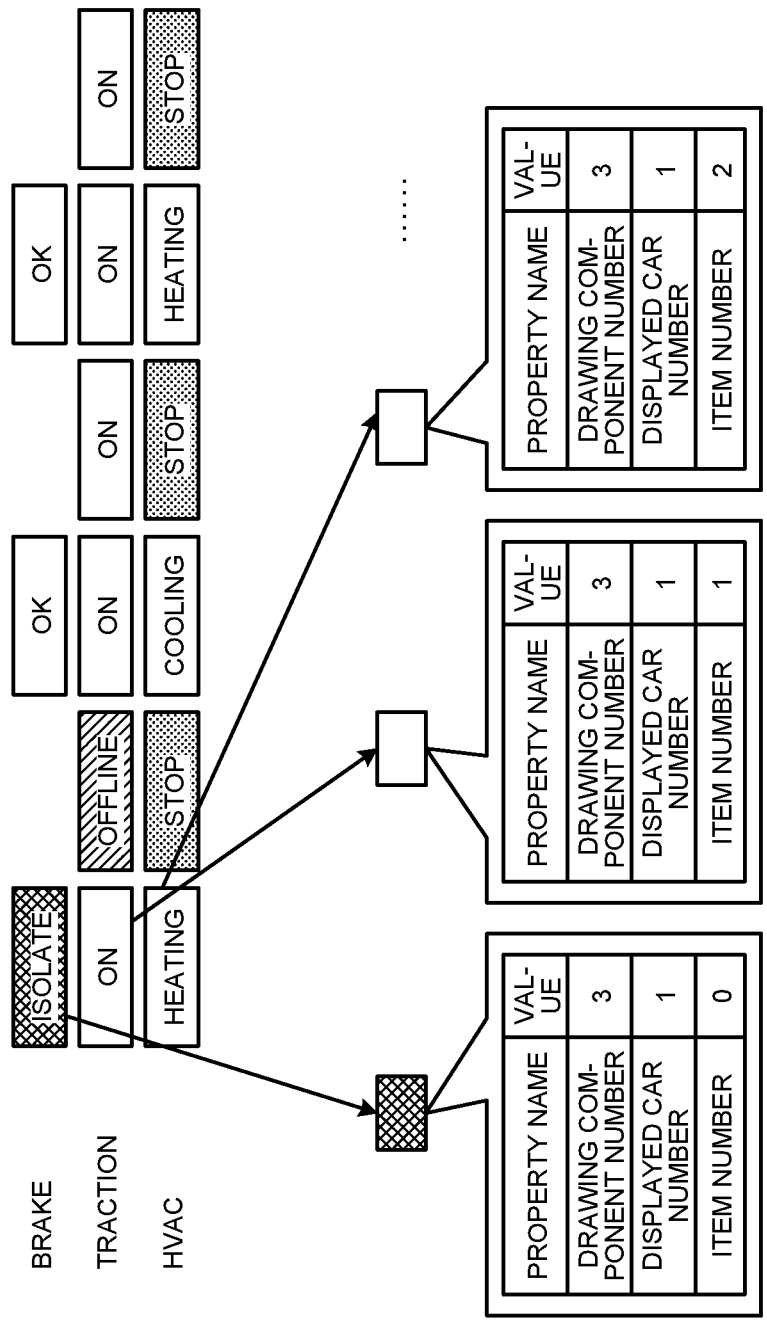
FIG. 29 is a diagram illustrating drawing component 3 generated by the generation unit of the drawing component generation device according to the first embodiment.

FIG. 29 is a diagram illustrating drawing component 3 generated by the generation unit 205 of the drawing component generation device 200 according to the first embodiment. The illustration in FIG. 29 assumes a drawing component for displaying the statuses of the brakes, of the tractions, and of the HVACs installed in the cars. The generation unit 205 can generate drawing component 3 illustrated in FIG. 29 by using the input information when the number of devices is "3" and the layout scheme is "ascending order, vertical arrangement" in the foregoing input screen illustrated in FIG. 22B. FIG. 30 is a diagram illustrating an example of display pattern definition assigned to drawing component 3 to be generated by the generation unit 205 of the drawing component generation device 200 according to the first embodiment. The user assigns at least one display pattern defined in the display pattern definition to each item number. The generation unit 205 receives, via the reception unit 203, setting relating to the display pattern definition from the user. FIG. 30 illustrates an example in which color pattern 4 and text pattern 1 are assigned to item number 0, color pattern 5 and text pattern 2 are assigned to item number 1, and color pattern 6 and text pattern 3 are assigned to item number 2. In a case in which the drawing data illustrated in FIG. 9 is obtained, the train cab display device 100 can provide the display as illustrated in FIG. 29 using drawing component 3. Specifically, in FIG. 29, the train cab display device 100 displays the device representing the brake in the car M001 in yellow with a text of ISOLATE, and displays the devices representing the respective brakes in the cars M003 and M005 in white with a text of OK.

The reception unit 203 may display the entries for the display pattern definition in the input screen to receive the setting relating to the display pattern definition through the input screen. FIG. 31 is a diagram illustrating another example of the input screen displayed on the display unit 204 by the reception unit 203 of the drawing component generation device 200 according to the first embodiment. The reception unit 203 includes the received information about the display pattern definition into the input information, and outputs the input information to the generation unit 205. The reception unit 203 may display the input screen that allows display pattern setting to be received on a per-device basis, that is, on a per-item number basis, in a case in which a different display pattern needs to be set for a different device.

Figure 32:
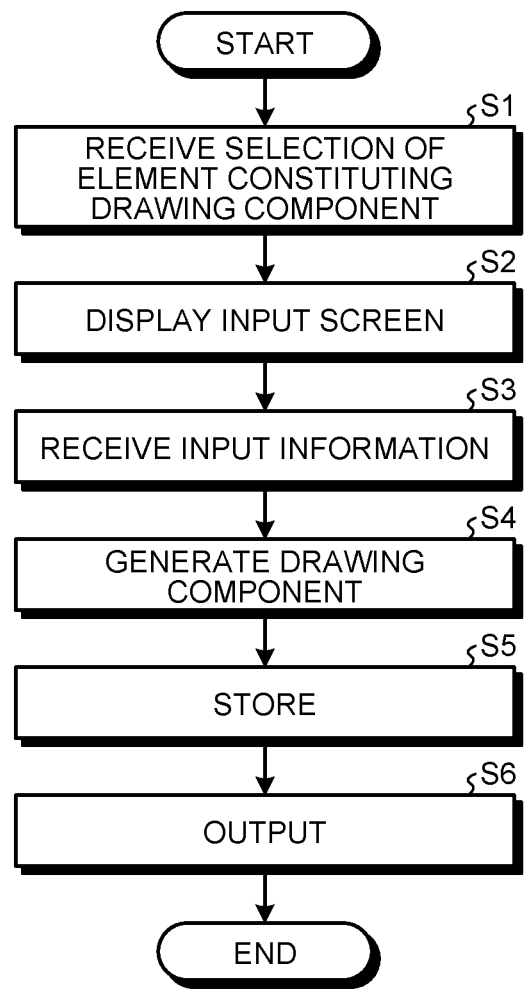
FIG. 32 is a flowchart illustrating an operation of generating a drawing component performed by the drawing component generation device according to the first embodiment.

An operation of the drawing component generation device 200 will now be described with reference to a flowchart. FIG. 32 is a flowchart illustrating an operation of generating a drawing component performed by the drawing component generation device 200 according to the first embodiment. In the drawing component generation device 200, the generation unit 205 receives, via the reception unit 203, a selection of an element that will constitute a drawing component (step S1). Upon reception of a request for "device assignment", the reception unit 203 displays, on the display unit 204, an input screen for receiving information necessary for generating the drawing component from the user, based on the train display definition held by the train display definition holding unit 201 and on the device layout definition held by the device layout definition holding unit 202 (step S2). The reception unit 203 receives the input information from the user via the input screen (step S3). The reception unit 203 outputs the input information received, to the generation unit 205. The generation unit 205 generates the drawing component based on the train display definition held by the train display definition holding unit 201, on the device layout definition held by the device layout definition holding unit 202, on the input information having been input from the user via the reception unit 203, and on the display pattern definition that defines the display content relating to the statuses of devices (step S4). The generation unit 205 stores the drawing component generated, in the storage unit 207 (step S5). The output unit 208 outputs the drawing component stored in the storage unit 207 to the train cab display device 100 (step S6).

A hardware configuration of the drawing component generation device 200 will next be described. In the drawing component generation device 200, the train display definition holding unit 201, the device layout definition holding unit 202, and the storage unit 207 are a memory. The functionality of the reception unit 203 to receive an input from a user is implemented by an input interface such as a button, a keyboard, or a mouse. The display unit 204 is a monitor such as a liquid crystal display (LCD). The functionality of the reception unit 203 to provide a display on the display unit 204, and the generation unit 205, the modification unit 206, and the output unit 208 are implemented in processing circuitry. The processing circuitry may be a combination of a processor that executes a program stored in a memory and the memory, or a dedicated hardware element.

Figure 33:
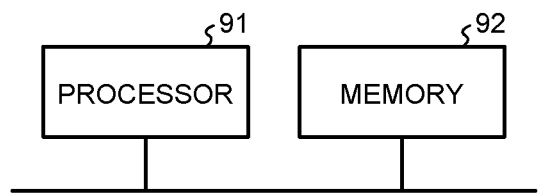
FIG. 33 is a diagram illustrating an example of a case in which a processor and a memory constitute processing circuitry included in the drawing component generation device according to the first embodiment.

FIG. 33 is a diagram illustrating an example of a case in which a processor and a memory constitute the processing circuitry included in the drawing component generation device 200 according to the first embodiment. In a case in which the processing circuitry includes a processor 91 and a memory 92, each functionality of the processing circuitry of the drawing component generation device 200 is implemented in software, firmware, or a combination of software and firmware. The software or firmware is described as a program or programs, and is stored in the memory 92. In the processing circuitry, the processor 91 reads and executes a program stored in the memory 92 to implement each functionality. That is, the processing circuitry includes the memory 92 for storing programs that cause the processing of the drawing component generation device 200 to be performed. It can also be said that these programs cause a computer to perform the procedure and the method of the drawing component generation device 200.

In this regard, the processor 91 may be a central processing unit (CPU), a processing unit, a computing unit, a microprocessor, a microcomputer, a digital signal processor (DSP), or the like. In addition, the memory 92 is, for example, a non-volatile or volatile semiconductor memory such as a random access memory (RAM), a read-only memory (ROM), a flash memory, an erasable programmable ROM (EPROM), an electrically EPROM (EEPROM) (registered trademark); a magnetic disk, a flexible disk, an optical disk, a compact disc, a MiniDisc, a digital versatile disc (DVD), or the like.

Figure 34:
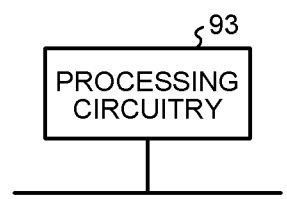
FIG. 34 is a diagram illustrating an example of a case in which a dedicated hardware element implements processing circuitry included in the drawing component generation device according to the first embodiment.

FIG. 34 is a diagram illustrating an example of a case in which a dedicated hardware element implements the processing circuitry included in the drawing component generation device 200 according to the first embodiment. In a case in which the processing circuitry includes a dedicated hardware element, a processing circuitry 93 illustrated in FIG. 34 is, for example, a single circuit, a set of multiple circuits, a programmed processor, a set of programmed parallel processors, an application specific integrated circuit (ASIC), a field programmable gate array (FPGA), or a combination thereof. The functionality of the drawing component generation device 200 may be implemented in the circuitry 93 on a function-by-function basis, or be implemented in the processing circuitry 93 collectively as a whole.

Note that the functionality of the drawing component generation device 200 may be implemented partly in the dedicated hardware element, and partly in software or firmware. Thus, the processing circuitry can provide the functionality described above by a dedicated hardware, software, firmware, or a combination thereof.

The drawing component generation device 200 may also be configured such that the reception unit 203 only includes the input interface for receiving an input from the user, whereas the functionality to display the input screen and the like on the display unit 204 is provided in the generation unit 205.

As described above, according to the present embodiment, the drawing component generation device 200 provide an input screen that displays entries for information for use in generation of a drawing component, and generates the drawing component based on a train display definition, on a device layout definition, on input information having been input from the user, and on a display pattern definition in a case in which the drawing component is generated using an element selected by the user. This enables the drawing component generation device 200 to generate a drawing component with a reduced amount of user operation, i.e., of task of inputting by the user.

Second Embodiment

A second embodiment will be described in the context of an operation in which the train cab display device 100 displays the statuses of devices installed in cars of a train using the drawing components generated by the drawing component generation device 200 in the display system 300.

Figure 35:
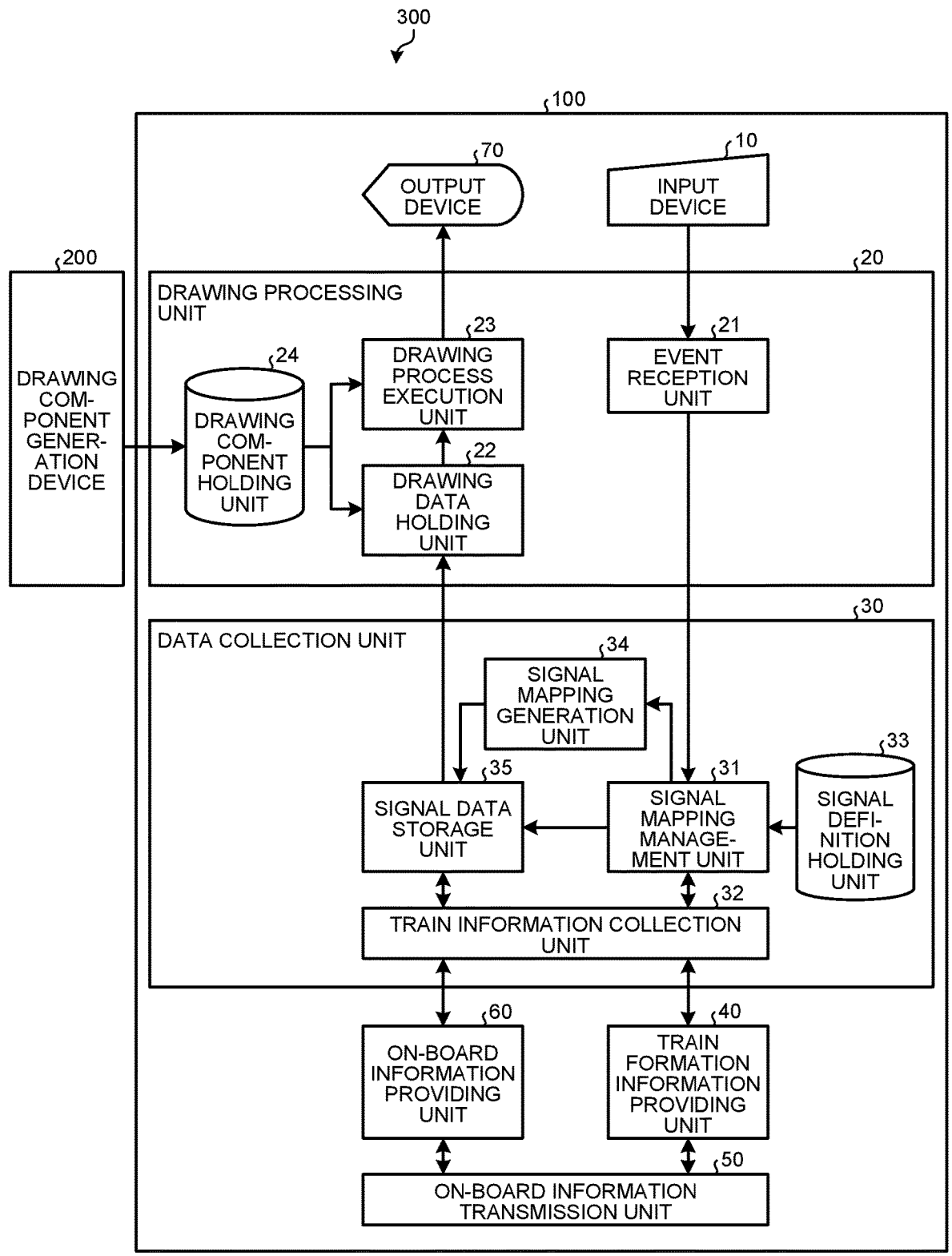
FIG. 35 is a block diagram illustrating an example configuration of the display system including the train cab display device according to a second embodiment.

FIG. 35 is a block diagram illustrating an example configuration of the display system 300 including the train cab display device 100 according to the second embodiment. FIG. 35 also illustrates the drawing component generation device 200 connected to the train cab display device 100. The train cab display device 100 includes an input device 10, a drawing processing unit 20, a data collection unit 30, a train formation information providing unit 40, an on-board information transmission unit 50, an on-board information providing unit 60, and an output device 70.

The input device 10 receives event information, for example, a request for displaying the statuses of devices, from a user such as the driver. The input device 10 is, for example, a switch, but may also be a keyboard, a mouse, or the like. Alternatively, the input device 10 may constitute a touch panel together with the output device 70.

The data collection unit 30 includes a signal mapping management unit 31, a train information collection unit 32, a signal definition holding unit 33, a signal mapping generation unit 34, and a signal data storage unit 35.

The signal mapping management unit 31 obtains formation information, including information on the number of cars and on the travel direction of the train, from the train information collection unit 32. In addition, the signal mapping management unit 31 generates a first signal based on a signal definition and on the formation information obtained, and outputs the first signal generated, to the train information collection unit 32 to request information on the status of a device from the train information collection unit 32. The signal definition is a basis for the first signal that requests information on the status of a device installed in a car, and is being held by the signal definition holding unit 33. Moreover, the signal mapping management unit 31 outputs the formation information obtained, to the signal mapping generation unit 34. The signal mapping management unit 31 also outputs the number of cars, i.e., number-of-cars information, to the signal data storage unit 35.

Upon obtaining the formation information of the train from the train formation information providing unit 40, the train information collection unit 32 outputs the formation information obtained, to the signal mapping management unit 31. The train information collection unit 32 may obtain the formation information by requesting the formation information from the train formation information providing unit 40 in response to a request from the signal mapping management unit 31, or may obtain the formation information by periodically requesting the formation information from the train formation information providing unit 40. In addition, upon reception of the first signal from the signal mapping management unit 31, the train information collection unit 32 requests information on the status of a device corresponding to the first signal from the on-board information providing unit 60. The train information collection unit 32 obtains a second signal, which is a response to the first signal, from the on-board information providing unit 60. The train information collection unit 32 outputs the value of the second signal obtained from the on-board information providing unit 60 to the signal data storage unit 35. The value of the second signal is information on the status of a device installed in that car or in another car.

The signal definition holding unit 33 holds the signal definition that is a basis for the first signal that requests information on the status of a device installed in a car. It is assumed that the signal definition is set in advance by train traffic management personnel or the like, and is stored in the signal definition holding unit 33 in a manner associated with the items of the status of device to be displayed by the drawing processing unit 20 on the output device 70.

The signal mapping generation unit 34 generates signal mapping information based on the formation information obtained from the signal mapping management unit 31, and outputs the signal mapping information to the signal data storage unit 35. The signal mapping information is information specifying the arrangement of the cars on the display screen 71 of the output device 70, on which the drawing processing unit 20 displays the statuses of devices. The signal mapping information specifically indicates which one of the leading car and the last car of the cars in the train composition is displayed on which side, e.g., on the left side or on the right side, of the display screen 71.

The signal data storage unit 35 holds the value of the second signal obtained from the train information collection unit 32 in relation to a request from the signal mapping management unit 31. The signal data storage unit 35 controls the storing position of the value of the second signal in the drawing processing unit 20, more specifically, in a drawing data holding unit 22 described later, based on the signal mapping information obtained from the signal mapping generation unit 34 to store the value of the second signal in the drawing data holding unit 22.

The drawing processing unit 20 includes an event reception unit 21, the drawing data holding unit 22, a drawing process execution unit 23, and the drawing component holding unit 24.

The event reception unit 21 outputs event information received from the user through the input device 10 to the data collection unit 30.

The drawing data holding unit 22 holds the drawing data, which is the value of the second signal stored by the data collection unit 30, in the drawing table of each of the drawing components, which are modularized parts of display content to be displayed on the display screen 71, based on the drawing components held by the drawing component holding unit 24. The drawing tables are specifically the drawing tables 22a to 22c described in the first embodiment.

The drawing process execution unit 23 displays the statuses of devices on the display screen 71 of the output device 70 using the multiple drawing components based on the drawing components held by the drawing component holding unit 24 and on the drawing data held in the drawing tables in the drawing data holding unit 22.

The drawing component holding unit 24 holds the drawing components generated by the drawing component generation device 200.

The train formation information providing unit 40 outputs the formation information to the train information collection unit 32 in response to a request from the train information collection unit 32. Note that the on-board information transmission unit 50 is installed in each of the cars constituting a train. The train formation information providing unit 40 can be aware of the number of the on-board information transmission units 50 on the train, i.e., the number of cars of the train, from the contents of the respective signals from the on-board information transmission units 50 installed in the other cars, obtained from the on-board information transmission unit 50. In addition, by outputting of the use status of the cab and/or the like by the on-board information transmission unit 50 installed in the leading car in the travel direction of the train to the on-board information transmission units 50 of the other cars, the train formation information providing unit 40 that has received the information on the use status of the cab via the on-board information transmission unit 50 can be aware of the travel direction of the train. The train formation information providing unit 40 generates formation information including information on the number of cars and the travel direction of the train, and outputs the formation information to the train information collection unit 32.

The on-board information transmission unit 50 obtains information on the statuses of devices installed in another car, and the like, via the on-board information transmission unit 50 installed in the other car, of those installed in the respective cars constituting the train. The on-board information transmission unit 50 also obtains information on the statuses of devices installed in that car, and the like. In addition, the on-board information transmission unit 50 outputs the information on the statuses of devices installed in that car, and the like, to the on-board information transmission unit 50 installed in another car.

The on-board information providing unit 60 obtains the second signal, which is information on the status of a device installed in that car or in another car corresponding to the first signal, via the on-board information transmission unit 50 upon reception of the first signal from the train information collection unit 32, and outputs the second signal to the train information collection unit 32. The on-board information providing unit 60 performs a similar process on all the first signals to obtain a second signal corresponding to the first signal and to output the second signal to the train information collection unit 32.

The output device 70 is a display unit to display the statuses of devices on the display screen 71 under control of the drawing process execution unit 23 of the drawing processing unit 20. The output device 70 is, for example, a monitor including an LCD or the like. Alternatively, the output device 70 may constitute a touch panel together with the input device 10 as described above.

The train cab display device 100 performs a drawing process using multiple drawing components, each of which is a modularized part of display content to be displayed on the display screen 71, to display the statuses of devices on the display screen 71 of the output device 70.

As illustrated in FIG. 2, the train cab display device 100 displays six cars corresponding to the train formation with an arrow indicating the travel direction on the display screen 71 of the output device 70. The train cab display device 100 also displays the open-close statuses of the doors installed in each of the cars, as the statuses of devices, on the display screen 71 of the output device 70. The train cab display device 100 further displays the use status, the fault status, or the like of each of the brakes, the tractions, and the HVACs, as the statuses of devices, on the display screen 71 of the output device 70.

In the train cab display device 100, the drawing processing unit 20 provides display control to modularize the display screen 71 illustrated in FIG. 2 into multiple drawing components illustrated in FIG. 3 rather than displaying as an integrated unit. As illustrated in FIG. 3, the content displayed on the display screen 71 is modularized such that a set of drawing of the train formation having six cars forms one drawing component, that is, modularized on a per-train basis.

The drawing data holding unit 22 of the drawing processing unit 20 holds the drawing data in tabular form having rows corresponding to respective cars and columns corresponding to respective car properties on a per-drawing component basis. The drawing process execution unit 23 performs a drawing process based on the drawing data held by the drawing data holding unit 22, and provides a display on the display screen 71 as illustrated in FIGS. 2 and 3.

To allow the drawing data holding unit 22 to hold the drawing data in tabular form on a per-drawing component basis, the signal definition holding unit 33 of the data collection unit 30 is configured to assign a signal to a drawing component on a per-car property basis, that is, to provide a definition of signal information on a per-column basis in each drawing table. Note that the number of columns, i.e., the number of cars, is determined by the formation information of the train obtained by the data collection unit 30. To obtain the second signal necessary for storing the drawing data in the drawing table for each drawing component, the signal mapping management unit 31 generates a first signal for each of the cars using the signal definition for each of the car properties, i.e., for each column of a drawing table. For example, to obtain the drawing data necessary for the drawing table corresponding to drawing component 3 illustrated in FIG. 3, the signal mapping management unit 31 generates a first signal for obtaining the second signal for the brakes, for the tractions, and for the HVACs of the six cars.

In addition, when the train cab display device 100 is installed in each of the leading car of the train where the driver resides and the last car of the train where the conductor resides, a different display pattern, i.e., a different arrangement of the cars, may be displayed in a different car. One example is that the train cab display device 100 displays the car in which that train cab display device 100 is installed on the left side of the display screen 71, in each of the leading car and the last car. In this case, although the information itself on the statuses of respective devices displayed on the display screen 71 of the train cab display device 100 is the same for the leading car and the last car, the display in the leading car and the display in the last car will be in a mutually laterally inverted configuration. In the context of the example of FIGS. 2 and 3, the train cab display device 100 in the leading car where the driver resides provides a display in the orientation illustrated in FIGS. 2 and 3, that is, displays the car indicated as "M001" on the left side. In contrast, the train cab display device 100 in the last car where the conductor resides provides a display in the orientation opposite the orientation in FIGS. 2 and 3, that is, displays the car indicated as "M006" on the left side.

The train cab display device 100 in the leading car and the train cab display device 100 in the last car on the same train obtain the same second signals, and hold the values of the respective second signals in the same arrangement up to the signal data storage unit 35. However, the signal data storage unit 35 of one of the train cab display devices 100 stores the values of the second signals in the drawing data holding unit 22 without changing the arrangement, whereas the signal data storage unit 35 of the other one of the train cab display devices 100 stores the values of the second signals in the drawing data holding unit 22 after changing the arrangement. The phrase "changing the arrangement" means that when the signal data storage unit 35 of the other one of the train cab display devices 100 is holding, for example, the value of the second signal of each device in an arrangement in order of the cars M001, M002, . . . , and M006 from left to right, the arrangement is changed to be in order of the cars M006, M005, . . . , and M001 from left to right, and the value of the second signal of each device is then stored in the drawing data holding unit 22.

In the train cab display device 100, the signal mapping generation unit 34 generates, based on the formation information of the train, signal mapping information, which is mapping information indicating whether to change the arrangement upon storing of the second signal obtained from the device to be displayed, in a table of the drawing data holding unit 22. The signal data storage unit 35 stores the value of the second signal obtained from the train information collection unit 32 in the drawing data holding unit 22, based on the signal mapping information.

The signal definition held by the signal definition holding unit 33, the first signal generated by the signal mapping management unit 31, and the value of the second signal stored in the drawing data holding unit 22 will now be described. FIG. 36 is a diagram illustrating an example of signal definition held for drawing component 2 by the signal definition holding unit 33 of the train cab display device 100 according to the second embodiment. The signal mapping management unit 31 obtains the second signal with respect to the number of cars from the train formation information providing unit 40 via the train information collection unit 32. The example of FIG. 36 illustrates that the signal mapping management unit 31 uses the signal definition of "door[1].R1" to generate the first signal for obtaining the information on the status of the door R1 from each car. The signal mapping management unit 31 knows that the train has a six-car formation from information on the number of cars of the train as described above. To obtain the second signal for the door R1 of the car M001 from the on-board information providing unit 60 via the train information collection unit 32, the signal mapping management unit 31 generate a signal of "car[1].door[1].R1" as the first signal. The signal mapping management unit 31 outputs the first signal generated, to the train information collection unit 32 to request information on the status of the door R1 of the car M001 from the train information collection unit 32. Upon reception of the first signal from the signal mapping management unit 31, the train information collection unit 32 obtains information on the door R1 of the car M001 from the on-board information providing unit 60, and outputs the information on the door R1 of the car M001 to the signal data storage unit 35 as the second signal, which is the response to the first signal.

The signal data storage unit 35 receives a signal of "car[1].door[1].R1", i.e., the second signal being the response to the first signal, from the train information collection unit 32, and holds the value of the second signal. The data collection unit 30 of the train cab display device 100 also obtains information on the statuses of the door R2, of the door L1, and of the door L2 in a similar manner, and holds the information in the signal data storage unit 35 as the values of the second signals. The first signal is represented such that, for example, the first signal for the door R2 of the car M001 is expressed as "car[1].door[2].R2", and the first signal for the door R1 of the car M002 is expressed as "car[2].door[1].R1". The signal mapping management unit 31 uses the number corresponding to the car number in car[ ] to generate a different first signal for the doors in a different car. The signal mapping management unit 31 generates 24 first signals to obtain information on the statuses of the four doors from the six cars.

FIGS. 37A to 37C are diagrams illustrating an example of storage method when the signal data storage unit 35 stores values of the second signals for drawing component 2 in the drawing table 22b of the drawing data holding unit 22 in the train cab display device 100 according to the second embodiment. In a case in which the orientation of the train is the same as the orientation on the display, the signal data storage unit 35 stores the signal data (FIG. 37A) stored in the signal data storage unit 35 in the drawing table 22b of the drawing data holding unit 22 without changing the order (FIG. 37B). For example, the signal data storage unit 35 stores the signal data for car 1 in the column for the displayed car number 1 in the drawing table 22b of the drawing data holding unit 22, and stores the signal data for car 6 in the column for the displayed car number 6 in the drawing table 22b of the drawing data holding unit 22. The drawing process execution unit 23 can display a drawing component having the display content illustrated in FIG. 6 on the display screen 71 of the output device 70 by using the drawing data having the content of FIG. 37B held in the drawing table of the drawing data holding unit 22.

Figure 38:
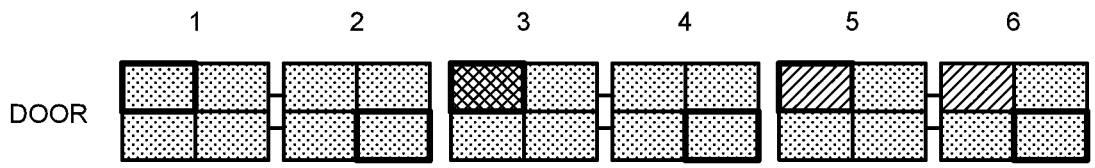
FIG. 38 is a diagram illustrating another example of drawing component 2 displayed by the train cab display device according to the second embodiment.

In contrast, in a case in which the orientation of the train differs from the orientation on the display, the signal data storage unit 35 stores the signal data (FIG. 37A) stored in the signal data storage unit 35 in the drawing table 22b of the drawing data holding unit 22 after reversing the order (FIG. 37C). For example, the signal data storage unit 35 stores the signal data for car 1 in the column for the displayed car number 6 in the drawing table 22b of the drawing data holding unit 22, and stores the signal data for car 6 in the column for the displayed car number 1 in the drawing table 22b of the drawing data holding unit 22. FIG. 38 is a diagram illustrating another example of drawing component 2 displayed by the train cab display device 100 according to the second embodiment. The train illustrated in FIG. 38 differs from the train illustrated in FIG. 6 in the direction by 180 degrees. The drawing process execution unit 23 can display a drawing component having the display content illustrated in FIG. 38 on the display screen 71 of the output device 70 by using the drawing data having the content of FIG. 37C held in the drawing table of the drawing data holding unit 22.

An operation has been described in which the train cab display device 100 provides a display on the display screen 71 of the output device 70 using drawing component 2. However, this is merely an example, and the train cab display device 100 can provide a display on the display screen 71 of the output device 70 using drawing component 1 and drawing component 3 using similar operations.

Figure 39:
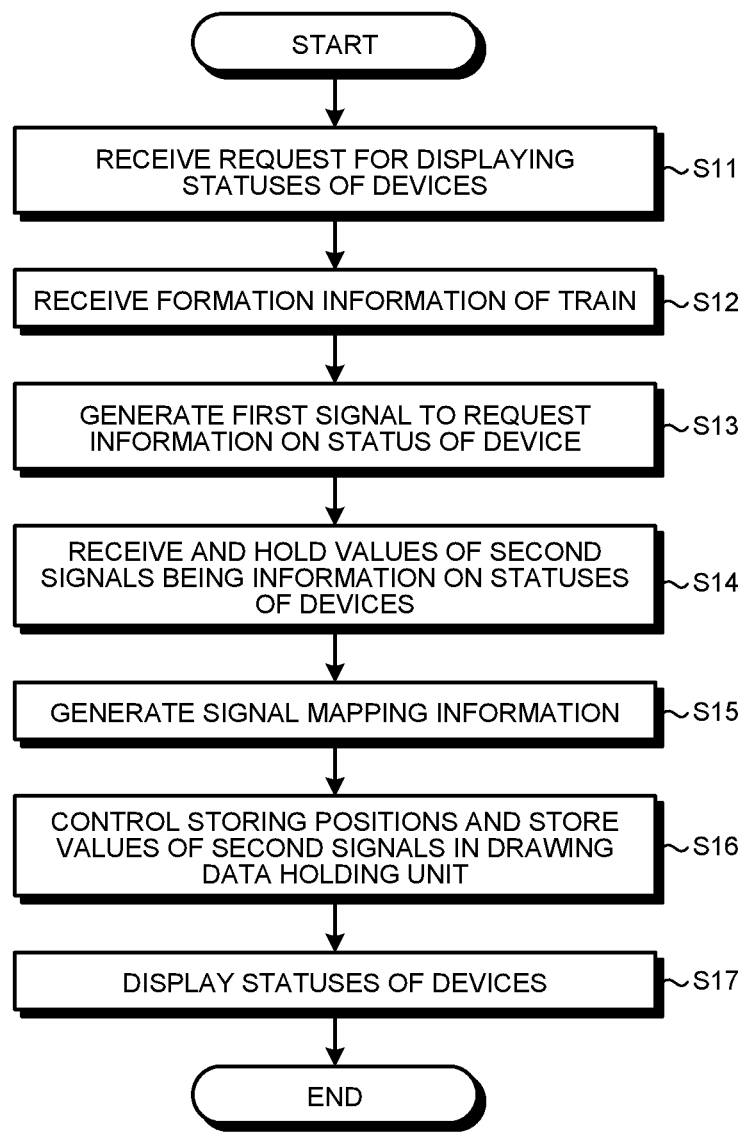
FIG. 39 is a flowchart illustrating an operation of displaying the statuses of devices installed in each of the cars of a train performed by the train cab display device according to the second embodiment.

An operation up to displaying the statuses of devices installed in each of the cars of the train on the display screen 71 of the output device 70 in the train cab display device 100 will be described with reference to a flowchart. FIG. 39 is a flowchart illustrating an operation of displaying the statuses of devices installed in each of the cars of the train performed by the train cab display device 100 according to the second embodiment. First, in the train cab display device 100, the input device 10 receives a request for displaying the statuses of devices from outside the train cab display device 100, for example, from the user (step S11). The input device 10 outputs information on the event of the request for displaying the statuses of devices to the event reception unit 21. The event reception unit 21 outputs the information on the event of the request for displaying the statuses of devices to the signal mapping management unit 31.

Upon reception of the information on the event of the request for displaying the statuses of devices, the signal mapping management unit 31 obtains the formation information of the train from the train formation information providing unit 40 via the train information collection unit 32 as described above (step S12).

The signal mapping management unit 31 generates first signals based on the signal definition held by the signal definition holding unit 33 and on the formation information received, and outputs the first signals to the train information collection unit 32 to request information on the statuses of devices installed in each of the cars from the train information collection unit 32 (step S13). The signal mapping management unit 31 may generate the first signals by obtaining the formation information in response to reception of a request for displaying the statuses of devices from outside, i.e., through the input device 10 via the event reception unit 21, or may generate the first signals upon a change in the formation information in a case of periodic reception of the formation information from the train formation information providing unit 40 via the train information collection unit 32.

The train information collection unit 32 requests information on the statuses of devices installed in each of the cars from the on-board information providing unit 60, and obtains information on the statuses of devices installed in each of the cars from the on-board information providing unit 60. The train information collection unit 32 outputs values of second signals, which are information on the statuses of devices installed in each of the cars, to the signal data storage unit 35. The signal data storage unit 35 holds the values of the second signals received (step S14).

Meanwhile, the signal mapping management unit 31 outputs the formation information to the signal mapping generation unit 34. The signal mapping generation unit 34 generates, based on the formation information, signal mapping information specifying the arrangement of the cars on the display screen 71 that displays the statuses of devices (step S15). The signal mapping generation unit 34 outputs the signal mapping information generated, to the signal data storage unit 35.

The signal data storage unit 35 controls the storing positions of the respective values of the second signals in the drawing data holding unit 22 based on the signal mapping information generated by the signal mapping generation unit 34, and stores the values of the second signals in the drawing data holding unit 22 (step S16).

The drawing process execution unit 23 then displays the statuses of devices on the display screen 71 of the output device 70 using multiple drawing components based on the drawing data held in the drawing tables in the drawing data holding unit 22 (step S17).

A hardware configuration of the train cab display device 100 will next be described. In the train cab display device 100, the input device 10 and the output device 70 are implemented by a touch panel. The on-board information transmission unit 50 is implemented in an interface circuit communicable with the on-board information transmission unit 50 on another car. The drawing processing unit 20, the data collection unit 30, the train formation information providing unit 40, and the on-board information providing unit 60 are implemented in processing circuitry. The processing circuitry of the train cab display device 100 is implemented in a configuration similar to the foregoing configuration of the processing circuitry of the drawing component generation device 200.

As described above, according to the present embodiment, the train cab display device 100 generates a first signal based on the signal definition, which is a basis for the first signal that requests information on the status of a device installed in a car, and based on the formation information of the train to request information on the status of a device, obtains the value of the second signal, which is information on the status of the device, controls the storing position of the value of the second signal in the drawing data holding unit 22, and stores the value of the second signal in the drawing data holding unit 22. The train cab display device 100 is capable of displaying the statuses of devices on the display screen 71 using multiple drawing components based on drawing data held in the drawing tables in the drawing data holding unit 22. The train cab display device 100 is also capable of displaying the statuses of devices on the display screen 71 after changing the color, image, text, and/or the like depending on the statuses of devices.

Third Embodiment

In the second embodiment, one first signal corresponds to one item of the drawing data held in the drawing data holding unit 22. In a third embodiment, a new value of a second signal is obtained by computation using the values of multiple second signals obtained in response to multiple first signals, and the new value of a second signal obtained by this computation is stored in the drawing data holding unit 22. Differences from the second embodiment will be described.

Figure 40:
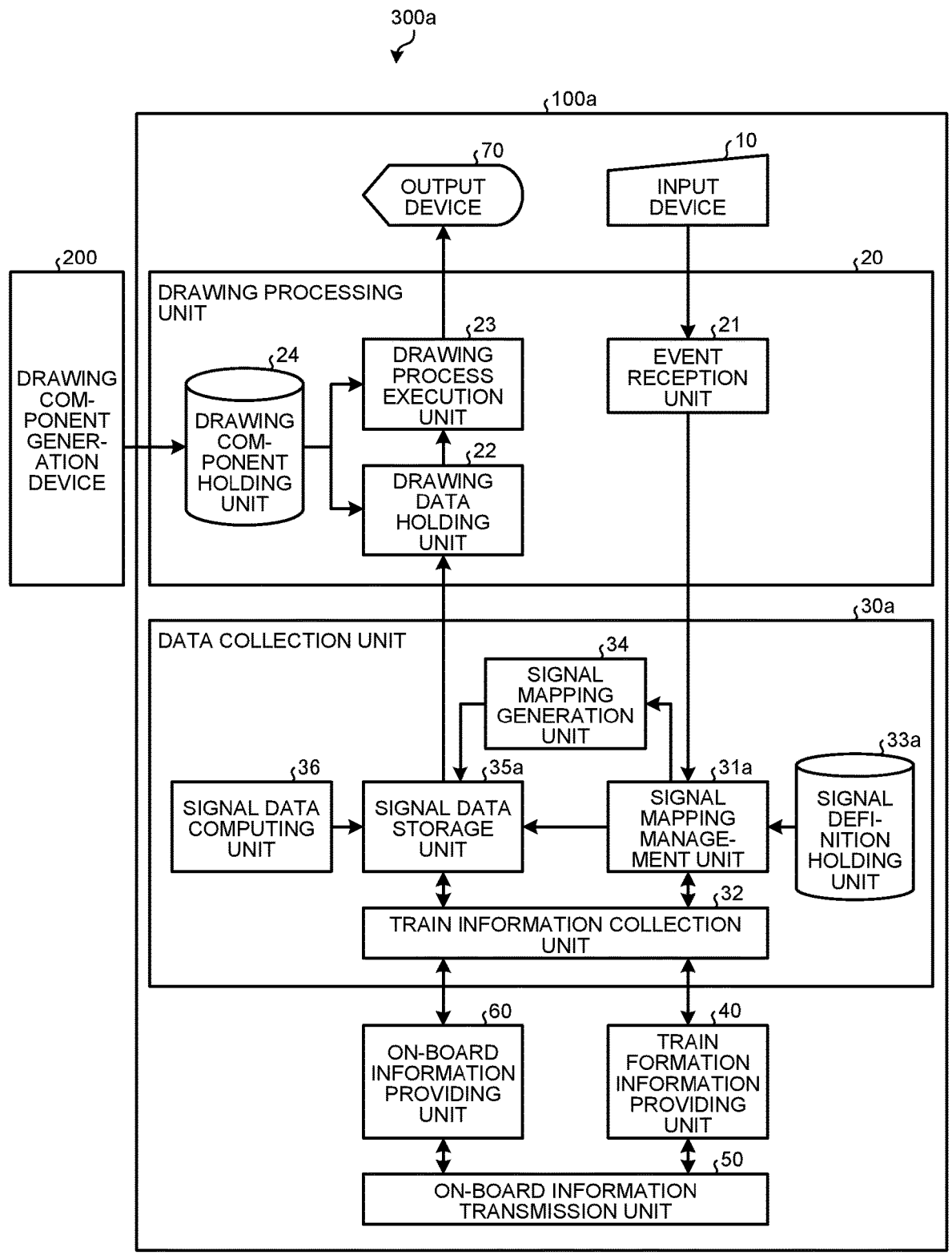
FIG. 40 is a block diagram illustrating an example configuration of a display system including a train cab display device according to a third embodiment.

FIG. 40 is a block diagram illustrating an example configuration of a display system 300a including a train cab display device 100a according to the third embodiment. FIG. 40 also illustrates the drawing component generation device 200 connected to the train cab display device 100a. As illustrated in FIG. 40, the train cab display device 100a and the drawing component generation device 200 constitute the display system 300a. The train cab display device 100a includes a data collection unit 30a in place of the data collection unit 30 of the train cab display device 100 of the first embodiment. The data collection unit 30a includes a signal mapping management unit 31a, a train information collection unit 32, a signal definition holding unit 33a, the signal mapping generation unit 34, a signal data storage unit 35a, and a signal data computing unit 36.

The signal definition holding unit 33a also holds, in addition to the signal definition held by the signal definition holding unit 33, information on an arithmetic expression for enabling the signal data computing unit 36 to compute a new value of a second signal using the values of multiple second signals, and signal definition serving as the basis for the first signals for obtaining the values of multiple second signals described above.

The signal mapping management unit 31a has functionality equivalent to the functionality of the signal mapping management unit 31, but due to the additional signal definition held by the signal definition holding unit 33a, needs to perform a higher amount of process of generation of the first signals than the signal mapping management unit 31.

The signal data computing unit 36 is a computing unit that obtains by computation the new value of a second signal indicating one status of a specified device using the values of multiple second signals.

The signal data storage unit 35a holds the new value of a second signal in addition to the values of the multiple second signals, and stores the new value of a second signal in the drawing data holding unit 22. Due to additional holding of the values of multiple second signals for obtaining the new value of a second signal, the signal data storage unit 35a has a larger area for holding the second signals than the signal data storage unit 35.

In the drawing processing unit 20, the drawing data held in a drawing table may possibly have no one-to-one correspondence with the value of a second signal obtained by the train information collection unit 32 in the process performed by the drawing process execution unit 23 to provide a display based on the drawing tables in the drawing data holding unit 22. For example, a status of a certain device may be derived from a combination of multiple types of second signals. Example of the multiple types of second signals include a signal indicating whether the device is installed or not, a signal indicating whether the status of the device is valid or not, a signal indicating the status of the device, and the like. Determination of a status of a device based on a combination of multiple types of second signals requires a computing process in the train cab display device 100a.

Thus, in the third embodiment, the signal definition holding unit 33a holds signal definition serving as the basis for the first signals for obtaining the multiple second signals to obtain by computation a new value of a second signal corresponding to an applicable item of the drawing data, in addition to the signal definition serving as the basis for the first signals for obtaining the second signals corresponding to the drawing data. The signal definition holding unit 33a also holds information on the arithmetic expression for computing the new value of a second signal using the values of multiple second signals.

The signal data computing unit 36 determines the necessity of computation based on the signal definition and on the information on the arithmetic expression held by the signal definition holding unit 33a, performs a computing process as needed, and stores the computation result, i.e., the new value of a second signal, in the signal data storage unit 35a. The signal mapping management unit 31a outputs the signal definition and the information on the arithmetic expression held by the signal definition holding unit 33a to the signal data computing unit 36 via the signal data storage unit 35a. Obtaining of a new value of a second signal by computation by the signal data computing unit 36 enables the train cab display device 100a to use, as the drawing data, the result of computation using multiple pieces of on-board information, i.e., information on the multiple statuses of devices, in combination.

Figure 41:
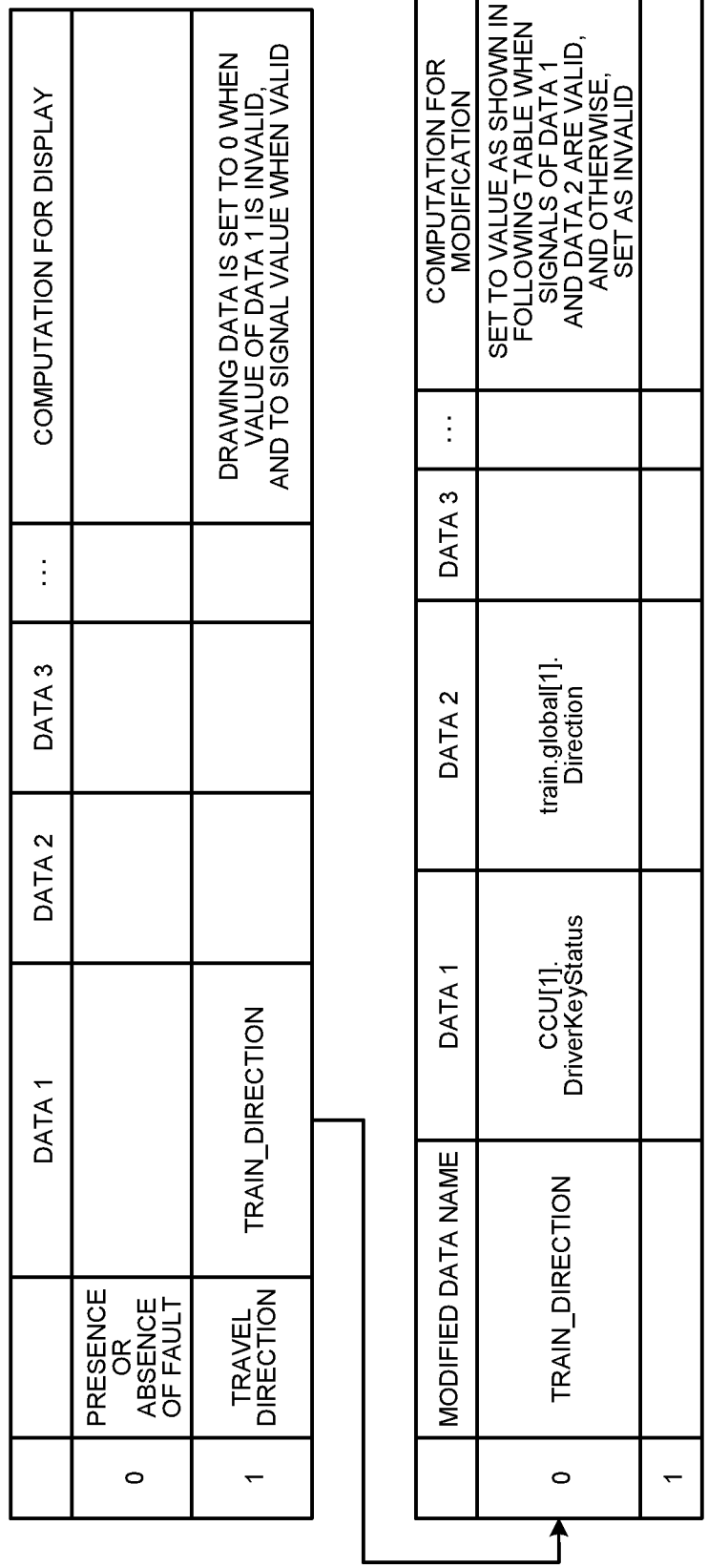
FIG. 41 is a diagram illustrating an example of signal definition held by the signal definition holding unit of the train cab display device according to the third embodiment.

FIG. 41 is a diagram illustrating an example of signal definition held by the signal definition holding unit 33a of the train cab display device 100a according to the third embodiment. FIG. 41 illustrates that a new value of a second signal corresponding to an applicable item of the drawing data is obtained by computation of the values of two types of second signals to obtain a corresponding piece of drawing data to be held in the drawing table 22b of the drawing data holding unit 22. The example of FIG. 41 indicates that the signal definition for the travel direction of the train is "TRAIN_DIRECTION", and that "TRAIN_DIRECTION" is computed using the values of two types of second signals obtained in response to two types of first signals based on two signal definitions of "CCU[1].DriverKeyStatus" and "train.global[1].Direction". The definition "CCU[1].DriverKeyStatus" represents the status of the driver key to be inserted by the train driver. For example, the state in which the driver key is inserted is represented by "1", whereas the state in which the driver key is not inserted is represented by "0". The definition "train.global[1].Direction" represents the orientation of the train. For example, the case in which the travel direction of the train is the direction of the car having the driver key in an inserted state is represented by "1", whereas the case in which the travel direction of the train is opposite to the direction of the car having the driver key in an inserted state is represented by "2".

The signal data storage unit 35*a* performs operation on the new value of a second signal obtained by computation by the signal data computing unit 36 similarly to the operation performed on the values of one type of second signal corresponding to one item of the drawing data, that is, similarly to the operation performed on the values of the second signals of the second embodiment. The new value of a second signal is also managed such that the signal data storage unit 35*a* controls the storing position of the value of the second signal in the drawing data holding unit 22 based on the signal mapping information, and stores the value of the second signal in the drawing data holding unit 22.

FIG. 42 is a diagram illustrating an example of the orientation of the train and the travel direction of the train displayed by the train cab display device 100*a* according to the third embodiment. As illustrated in Example 1, when the car having the driver key in an inserted state is car 1, and the travel direction of the train is the direction toward car 1, "TRAIN_DIRECTION" has a value of "1". When the data representing the travel direction of the train is "1", the displayed arrow is a left arrow as illustrated in FIGS. 20 and 26. Thus, the train cab display device 100*a* obtains by computation a new value of the signal representing one status of a specified device using multiple values of respective signals representing statuses of devices, and can thus provide a display depending on the computed value obtained, using a drawing component.

FIG. 43 is a flowchart illustrating an operation of displaying the statuses of devices installed in each of the cars of the train performed by the train cab display device 100*a* according to the third embodiment. The operation from step S11 to step S15 is similar to the operation in the second embodiment illustrated in FIG. 39. The signal data computing unit 36 obtains a new value of a second signal using the values of multiple second signals required of computation, of the second signals held by the signal data storage unit 35*a*, based on the signal definition and on the information on the arithmetic expression held by the signal definition holding unit 33*a* (step S21). The signal data computing unit 36 stores the new value of a second signal obtained by the computation in the signal data storage unit 35*a*. The operation of step S16 and step S17 after step S21 is similar to the operation in the second embodiment illustrated in FIG. 39.

A hardware configuration of the train cab display device 100*a* in the third embodiment is implemented in a configuration similar to the hardware configuration of the train cab display device 100 in the second embodiment.

As described above, according to the present embodiment, the train cab display device 100*a* obtains by computation a new value of a second signal from the values of multiple second signals, and stores the new value of a second signal in the drawing data holding unit 22. This enables the train cab display device 100*a* to use, as the drawing data, the result of computation using information on the multiple statuses of devices in combination.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

10 input device;
20 drawing processing unit;
21 event reception unit;
22 drawing data holding unit;
22*a*, 22*b*, 22*c* drawing table;
23 drawing process execution unit;
24 drawing component holding unit;
30, 30*a* data collection unit;
31, 31*a* signal mapping management unit; train information collection unit;
33, 33*a* signal definition holding unit;
34 signal mapping generation unit;
35, 35*a* signal data storage unit;
36 signal data computing unit;
40 train formation information providing unit;
50 on-board information transmission unit;
60 on-board information providing unit;
70 output device;
71 display screen;
100, 100*a* train cab display device;
200 drawing component generation device;
201 train display definition holding unit;
202 device layout definition holding unit;
203 reception unit;
204 display unit;
205 generation unit;
206 modification unit;
207 storage unit;
208 output unit;
300, 300*a* display system.

The invention claimed is:

1. A drawing component generation device that generates a drawing component being a modularized part of display content when a display device installed in a train is to display a status of a device installed in a car of the train on a display screen using the drawing component, the drawing component generation device comprising:

a receiver to provide an input screen displaying entries for information for use in generation of the drawing component, based on a train display definition that defines a train formation pattern representing an arrangement of cars in a formation of the train, and on a device layout definition that defines a layout pattern representing a device layout in the car, and to receive an input of information for the entries from a user; and generation circuitry to generate the drawing component based on the train display definition, on the device layout definition, on input information being information input from the user on the receiver, and on a display pattern definition that defines display content relating to the status of the device, wherein the receiver provides, as the entries for information, an entry for a car including a device to be displayed in the drawing component, an entry for a number of devices installed in each of the cars, an entry for the layout pattern, an entry for identification information of the drawing component, and an entry for a first number of an item number that identifies a status to be displayed in the drawing component, and the receiver receives an input of information for each of the entries from the user, wherein the receiver is configured to receive the input of information for a plurality of the entries for information from the user prior to generation of the drawing component based on the input information.

2. The drawing component generation device according to claim 1, wherein the generation circuitry generates a drawing component that allows a display to be provided in a display color dependent on the status of the device, based on a color pattern included in the display pattern definition.

3. The drawing component generation device according to claim 1, wherein
the generation circuitry generates a drawing component that allows a display image to be displayed that is dependent on the status of the device, based on an image pattern included in the di splay pattern definition.

4. The drawing component generation device according to claim 1, wherein
the generation circuitry generates a drawing component that allows a displayed text to be displayed that is dependent on the status of the device, based on a text pattern included in the display pattern definition.

5. The drawing component generation device according to claim 1, comprising:
a memory to store the drawing component; and
modification circuitry to, upon reception by the receiver of input information different in content from input information received upon generation with respect to the drawing component stored in the memory, modify the drawing component stored in the memory and relating to the input information received.

6. A display system comprising:
the drawing component generation device according to claim 1; and
a display device to display the status of the device installed in the car of the train using the drawing component generated by the drawing component generation device.

7. The display system according to claim 6, wherein
the display device obtains by computation a new value of a signal indicating one status of a specified device using a plurality of values of signals each representing the status of the device, and provides a display depending on a computed value obtained, using the drawing component.

8. The drawing component generation device according to claim 1, wherein the generation circuitry is configured to generate, within a single screen, a plurality of drawing components including the drawing component, wherein one drawing component depicts a plurality of cars of the train and another drawing component depicts one or more doors within each of the depicted plurality of cars of the train.

9. The drawing component generation device according to claim 1, wherein the train display definition includes a plurality of car orientations for a plurality of cars of the train, wherein a car orientation for one car of the plurality of train cars is different from the car orientation of another car of the plurality of train cars.

10. The drawing component generation device according to claim 1, wherein the receiver is configured to receive the input of information for each of the entries of information from the user prior to the generation of the drawing component based on the input information.

11. A drawing component generation method performed in a drawing component generation device that generates a drawing component being a modularized part of display content when a display device installed in a train is to display a status of a device installed in a car of the train on a display screen using the drawing component, the drawing component generation method comprising:
reception of an input screen displaying entries for information for use in generation of the drawing component based on a train display definition that defines a train formation pattern representing an arrangement of cars in a formation of the train, and on a device layout definition that defines a layout pattern representing a device layout in the car, and receiving an input of information for the entries from a user; and
generation of the drawing component based on the train display definition, on the device layout definition, on input information being information input from the user in the reception, and on a display pattern definition that defines display content relating to the status of the device, wherein
the reception includes providing, as the entries for information, an entry for a car including a device to be displayed in the drawing component, an entry for a number of devices installed in each of the cars, an entry for the layout pattern, an entry for identification information of the drawing component, and an entry for a first number of an item number that identifies a status to be displayed in the drawing component, and receiving an input of information for each of the entries from the user,
wherein the reception of the input of information for a plurality of the entries for information from the user occurs prior to generation of the drawing component based on the input information.

12. The drawing component generation method according to claim 11, wherein
the generation includes generating a drawing component that allows a display to be provided in a display color dependent on the status of the device, based on a color pattern included in the display pattern definition.

13. The drawing component generation method according to claim 11, wherein
the generation includes generating a drawing component that allows a display image to be displayed that is dependent on the status of the device, based on an image pattern included in the display pattern definition.

14. The drawing component generation method according to claim 11, wherein
the generation includes generating a drawing component that allows a displayed text to be displayed that is dependent on the status of the device, based on a text pattern included in the display pattern definition.

15. The drawing component generation method according to claim 11, comprising:
upon reception of input information different in content from input information received upon generation with respect to the drawing component stored in a memory that stores the drawing component, modification of the drawing component stored in the memory and relating to the input information received.

16. The drawing component generation method according to claim 11, further comprising generating, within a single screen, a plurality of drawing components including the drawing component, wherein one drawing component depicts a plurality of cars of the train and another drawing component depicts one or more doors within each of the depicted plurality of cars of the train.

17. The drawing component generation method according to claim 11, wherein the train display definition includes a plurality of car orientations for a plurality of cars of the train, wherein a car orientation for one car of the plurality of train cars is different from the car orientation of another car of the plurality of train cars.

18. The drawing component generation method according to claim 11, wherein the reception of the input of information for each of the entries for information from the user occurs prior to the generation of the drawing component based on the input information.

\* \* \* \* \*